US010313307B2

United States Patent
Bone

(10) Patent No.: US 10,313,307 B2
(45) Date of Patent: Jun. 4, 2019

(54) COMMUNICATING WITH A MACHINE TO MACHINE DEVICE

(71) Applicant: VODAFONE IP LICENSING LIMITED, Newbury, Berkshire (GB)

(72) Inventor: Nick Bone, Newbury (GB)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 74 days.

(21) Appl. No.: 15/021,879

(22) PCT Filed: Sep. 12, 2014

(86) PCT No.: PCT/GB2014/052773
§ 371 (c)(1),
(2) Date: Mar. 14, 2016

(87) PCT Pub. No.: WO2015/036778
PCT Pub. Date: Mar. 19, 2015

(65) Prior Publication Data
US 2016/0234255 A1 Aug. 11, 2016

(30) Foreign Application Priority Data

Sep. 13, 2013 (GB) .................................... 1316370
Oct. 16, 2013 (GB) .................................... 1318339
(Continued)

(51) Int. Cl.
*H04L 29/06* (2006.01)
*H04W 4/70* (2018.01)
(Continued)

(52) U.S. Cl.
CPC ............ *H04L 63/04* (2013.01); *G06F 9/4401* (2013.01); *G06F 13/1689* (2013.01);
(Continued)

(58) Field of Classification Search
CPC ... H04L 63/062; H04L 63/0869; H04L 63/10; H04L 63/08; H04L 67/1095;
(Continued)

(56) References Cited

U.S. PATENT DOCUMENTS 7,069,452 B1 6/2006 Hind et al.
7,360,129 B2 4/2008 Tang
(Continued)

FOREIGN PATENT DOCUMENTS

DE 102010010760 9/2011
EP 2536173 12/2012
(Continued)

OTHER PUBLICATIONS

"Lightweight Machine to Machine Technical Specification; OMA-TS LightweightM2M-V1 0-20130912-D RM" Sep. 2013, pp. 1-101.*
(Continued)

*Primary Examiner* — Brandon S Hoffman
*Assistant Examiner* — Nega Woldemariam
(74) *Attorney, Agent, or Firm* — Workman Nydegger

(57) ABSTRACT

The present disclosure provides methods and apparatus for administering an interface between a machine-to-machine, M2M, device and a network application function, NAF, for secure communication between the M2M device and the NAF. In one method, the M2M device comprises security information for enabling secure communication via the interface, and administers the interface by: setting a secure interface lifetime parameter based on a lifetime of at least part of the security information; and transmitting administration data to the NAF, wherein the administration data comprises the secure interface lifetime parameter.

20 Claims, 5 Drawing Sheets

(30) Foreign Application Priority Data

| | | | |
|---|---|---|---|
| May 30, 2014 | (GB) | ................................... | 1409641 |
| May 30, 2014 | (GB) | ................................... | 1409643 |
| May 30, 2014 | (GB) | ................................... | 1409652 |
| May 30, 2014 | (GB) | ................................... | 1409663 |
| Aug. 22, 2014 | (GB) | ................................... | 1414999 |

(51) Int. Cl.

| | |
|---|---|
| *H04W 4/50* | (2018.01) |
| *H04W 4/14* | (2009.01) |
| *H04W 12/02* | (2009.01) |
| *H04W 12/04* | (2009.01) |
| *H04W 88/02* | (2009.01) |
| *H04W 88/06* | (2009.01) |
| *H04L 29/08* | (2006.01) |
| *H04W 28/08* | (2009.01) |
| *H04W 80/06* | (2009.01) |
| *G06F 21/60* | (2013.01) |
| *H04B 1/3816* | (2015.01) |
| *G06F 13/16* | (2006.01) |
| *G06F 13/28* | (2006.01) |
| *G06F 13/40* | (2006.01) |
| *H04W 4/12* | (2009.01) |
| *H04W 12/06* | (2009.01) |
| *H04W 52/02* | (2009.01) |
| *G06F 21/71* | (2013.01) |
| *H04L 9/08* | (2006.01) |
| *H04W 8/04* | (2009.01) |
| *G06F 9/4401* | (2018.01) |

(52) U.S. Cl.
CPC .......... *G06F 13/28* (2013.01); *G06F 13/4027* (2013.01); *G06F 21/606* (2013.01); *G06F 21/71* (2013.01); *H04B 1/3816* (2013.01); *H04L 9/0861* (2013.01); *H04L 63/029* (2013.01); *H04L 63/0428* (2013.01); *H04L 63/0442* (2013.01); *H04L 63/061* (2013.01); *H04L 63/062* (2013.01); *H04L 63/08* (2013.01); *H04L 63/0823* (2013.01); *H04L 63/0869* (2013.01); *H04L 63/0876* (2013.01); *H04L 63/10* (2013.01); *H04L 63/166* (2013.01); *H04L 63/20* (2013.01); *H04L 67/1095* (2013.01); *H04L 67/125* (2013.01); *H04L 67/42* (2013.01); *H04W 4/12* (2013.01); *H04W 4/14* (2013.01); *H04W 4/50* (2018.02); *H04W 4/70* (2018.02); *H04W 8/04* (2013.01); *H04W 12/02* (2013.01); *H04W 12/04* (2013.01); *H04W 12/06* (2013.01); *H04W 28/08* (2013.01); *H04W 52/0229* (2013.01); *H04W 80/06* (2013.01); *H04W 88/02* (2013.01); *H04W 88/06* (2013.01); *H04L 63/0838* (2013.01); *H04L 2463/061* (2013.01); *Y02D 10/14* (2018.01); *Y02D 10/151* (2018.01); *Y02D 70/00* (2018.01); *Y02D 70/1222* (2018.01); *Y02D 70/1224* (2018.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/162* (2018.01); *Y02D 70/166* (2018.01); *Y02D 70/168* (2018.01); *Y02D 70/21* (2018.01); *Y02D 70/22* (2018.01)

(58) Field of Classification Search
CPC .... H04L 63/029; H04W 4/001; H04W 4/005; H04W 4/14; H04W 12/02; H04W 12/04; H04W 88/02; H04W 88/06; H04W 4/12; H04W 12/06; H04W 52/0229; G06F 13/1689; G06F 13/4027
USPC ........................................................... 726/3
See application file for complete search history.

(56) References Cited

U.S. PATENT DOCUMENTS

| | | |
|---|---|---|
| 8,934,453 B1 | 1/2015 | Sarnaik et al. |
| 9,603,189 B2 | 3/2017 | Holtmanns et al. |
| 9,800,621 B2 | 10/2017 | Starsinic |
| 2003/0033591 A1 | 2/2003 | Fournier |
| 2003/0051140 A1 | 3/2003 | Buddhikot |
| 2003/0123669 A1 | 7/2003 | Koukoulidis |
| 2003/0229686 A1 | 12/2003 | Kortright |
| 2003/0229786 A1 | 12/2003 | Hollis et al. |
| 2005/0120106 A1 | 6/2005 | Alertao |
| 2006/0196931 A1 | 9/2006 | Holtmanns et al. |
| 2006/0251257 A1 | 11/2006 | Haverinen et al. |
| 2007/0118560 A1 | 5/2007 | Bornhoevd |
| 2007/0169107 A1 | 7/2007 | Huttunen |
| 2007/0234041 A1 | 10/2007 | Lakshmeshwar et al. |
| 2007/0240205 A1 | 10/2007 | Holtmanns et al. |
| 2007/0248232 A1 | 10/2007 | Driscoll et al. |
| 2008/0153521 A1 | 6/2008 | Benaouda |
| 2009/0138955 A1 | 5/2009 | Vinayakray-Jani |
| 2010/0302009 A1 | 12/2010 | Hoeksel |
| 2010/0304716 A1 | 12/2010 | Hoeksel |
| 2011/0010543 A1 | 1/2011 | Schmidt et al. |
| 2011/0126017 A1 | 5/2011 | Blom et al. |
| 2011/0132987 A1 | 6/2011 | Hoeksel |
| 2011/0137916 A1 | 6/2011 | Deen |
| 2011/0173450 A1 | 7/2011 | Knobbe et al. |
| 2011/0265158 A1 | 10/2011 | Cha et al. |
| 2011/0289315 A1* | 11/2011 | Laitinen ............... G06F 21/575 713/156 |
| 2011/0320802 A1 | 12/2011 | Wang et al. |
| 2012/0041867 A1 | 2/2012 | Glodjo et al. |
| 2012/0072979 A1 | 3/2012 | Cha |
| 2012/0311335 A1 | 12/2012 | Fransen |
| 2012/0322457 A1 | 12/2012 | Lee |
| 2013/0012159 A1 | 1/2013 | Lodeweyckx |
| 2013/0016657 A1 | 1/2013 | Muhanna et al. |
| 2013/0039493 A1 | 2/2013 | Bauernfeind |
| 2013/0212236 A1 | 8/2013 | Foti et al. |
| 2013/0217361 A1 | 8/2013 | Mohammed |
| 2013/0275758 A1 | 10/2013 | Marlow |
| 2014/0011478 A1 | 1/2014 | Collins et al. |
| 2014/0040988 A1 | 2/2014 | Nozulak |
| 2014/0146826 A1 | 5/2014 | Herriot |
| 2014/0179263 A1 | 6/2014 | Collins et al. |
| 2014/0179360 A1 | 6/2014 | Jackson |
| 2014/0189075 A1 | 7/2014 | Stansell |
| 2014/0233735 A1 | 8/2014 | Zhang |
| 2014/0235285 A1 | 8/2014 | Stojanovski |
| 2014/0315514 A1 | 10/2014 | Collins et al. |
| 2014/0330952 A1 | 11/2014 | Starsinic |
| 2015/0023219 A1 | 1/2015 | Jin |
| 2015/0133077 A1 | 5/2015 | Collins et al. |
| 2015/0215163 A1 | 7/2015 | Kowalski et al. |
| 2015/0244676 A1 | 8/2015 | Collins et al. |
| 2015/0296379 A1 | 10/2015 | Nix |
| 2015/0319156 A1 | 11/2015 | Guccione et al. |
| 2015/0332399 A1 | 11/2015 | Glodjo et al. |
| 2016/0036779 A1 | 2/2016 | Collins et al. |
| 2016/0226828 A1 | 8/2016 | Bone et al. |
| 2016/0226847 A1 | 8/2016 | Bone et al. |
| 2016/0232116 A1 | 8/2016 | Bone et al. |
| 2016/0234181 A1 | 8/2016 | Bone et al. |
| 2016/0234182 A1 | 8/2016 | Bone et al. |
| 2016/0234683 A1 | 8/2016 | Bone et al. |

FOREIGN PATENT DOCUMENTS

| | | |
|---|---|---|
| EP | 2654332 A1 | 10/2013 |
| EP | 2713642 A1 | 4/2014 |

(56) References Cited

FOREIGN PATENT DOCUMENTS

| | | |
|---|---|---|
| KR | 20130127826 | 11/2013 |
| WO | 2004114144 | 12/2004 |
| WO | 2007042345 A1 | 4/2007 |
| WO | 2009004590 | 1/2009 |
| WO | 20100102259 | 9/2010 |
| WO | 2011085810 | 7/2011 |
| WO | 2011131220 | 10/2011 |
| WO | 2012062077 A1 | 5/2012 |
| WO | 2012094879 A1 | 7/2012 |
| WO | 2012131659 | 10/2012 |
| WO | 2012151819 A1 | 11/2012 |
| WO | 2013060302 | 5/2013 |
| WO | 2013113162 A1 | 8/2013 |
| WO | 2013120225 A1 | 8/2013 |
| WO | 2014041806 A1 | 3/2014 |
| WO | 2014165747 | 10/2014 |

OTHER PUBLICATIONS

Search Report issued in GB1409652.3 dated Oct. 8, 2014.
Search Report issued in GB1409641.6 dated Nov. 7, 2014.
3GPP TS 33.220 v 12.1.0 "Technical Specification Group Services and System Aspects; Generic Authenitcation Architecture (GAA); Generic Bootstrapping Architectuer (GBA) (Release 12)" Jun. 26, 2013.
3GPP TS 33.223 v 11.0.0 "Technical Specifiaction Group Services and System Aspects; Generic Authentication Architecture (GAA); Generic Bootstrapping Archtitecture (GBA) Push Function (Release 11)" Sep. 19, 2012.
Search Report issued in GB1409643.2 dated Oct. 14, 2014.
Cambridge Wireless pdf Presentation Apr. 18, 2013. (www.cambridgewireless.co.uk/Presentation/CD180413_AmyasPhillips.pdf).
Bhattacharyya et al. "Lightweight Mutual Authenticaion for CoAP (WIP)" Mar. 3, 2014. (http://wiki.tools.ietf.org/html/draft-bhattacharyya-core-coap-lite-auth-00_lightweight_mutual_authentication_for_coAP).
Further Search Report issued in GB1409663.0 dated May 29, 2015.
Further Search Report issued in GB1409663.0 dated May 28, 2015.
Search Report issued in GB1409663.0 dated Nov. 11, 2014.
Menezes et al. "Handbook of Applied Cryptography" 1997, CRC Press, p. 22-25 and 551-553.
Search Report issued in GB1414999.1 dated Jan. 13, 2015.
Generic Authentication Architecture (GAA), 3GPP TR 33.919, 3rd Generation Partnership Project (3GPP), V11.0.0 Sep. 2012. (section 7.3.2).
International Search Report and Written Opinion issued in PCT/GB2014/052773 dated Jan. 23, 2015.
"Lightweight Machine to Machine Technical Specification" Open Mobile Alliance, Sep. 12, 2013.
Agarwal et al. "Operator-Based Over-the-Air M2M Wireless Sensor Network Security" Intelligence in Next Generation Networks, Oct. 11, 2010, pp. 1-5.
"Lightweight Machine to Machine Technical Specifiaction" Open Mobile Alliance, Dec. 10, 2013, pp. 1-104.
Office Action issued in U.S. Appl. No. 15/021,885 dated Nov. 3, 2017.
Shelby "OMA Lightweight M2M Tutorial" May 19, 2013.
Search Report issued in GB1415003.1 dated Dec. 10, 2014.
Becker "The Contrained Application Protocol for Pervasive M2M Communications" PERCOM Workshops, 2012 IEEE Mar. 19-23, 2012, pp. 483-485.
Search Report issued in GB1415931.3 dated Mar. 18, 2015.
Search Report issued in GB1414997.5 dated Jan. 16, 2015.
International Search Report and Written Opinion issued in PCT/GB2014/052786 dated Jan. 23, 2015.
"Large Scale Integrating Project EXALTED Expanding LTE for Devices WP4—End-to-End (E2E) M2M System" Oct. 31, 2012.
"OneM2M Architecture Analysis Part 1: Analysis of Architecture Proposed for Consideration by OneM2M" Jul. 28, 2013.
Fujitsu et al. "OMA-DMM M2M Considerations" May 2, 2011, 23 pages.
"Discussion Material for Joint Conference Call with OMA DM" ETSI M2M Management WG, Apr. 2011, 14 pages.
Alcatel-Lucent "Presentation of WID Information: Management Interface for M2M 1.0" Sep. 10, 2013, pp. 1-15.
Office Action issued in U.S. Appl. No. 15/021,876 dated Mar. 31, 2017.
International Search Report and Written Opinion issued in PCT/GB2014/052766 dated Jan. 23, 2015.
Ericsson "GBA for Constrained Devices" 3GPP Draft: S3-131053 PCR33868, Nov. 4, 2013.
International Search Report and Written Opinion issued in PCT/GB2014/052768 dated Apr. 22, 2015.
Exalted "WP5—Security, Authenitcation & Provisioning. Deliverable 5.1 Security and Provisioning Solutions" Feb. 29, 2012, Chapter 5.
"3GPP Technical Specification Group Services and System Aspects; Security Aspects of Machine-Type Communications (Release 11)" Jul. 13, 2012.
Asokan et al. "Applicability of Identity-Based Crypotgraphy for Disruption- olerant Networking" Proceedings of the 1st International Mobisys Workshop on Mobile Opporunistic Networking, Jan. 1, 2007, p. 52.
"3GPP Technical Specification Group Services and System Aspects; IP Multimedia Subsystem (IMS) Media Plane Security (Release 10)" Jun. 2012.
Gemalto "Corrections and Clarifications in Security Text" Mar. 22, 2012, pp. 1-32.
International Search Report and Written Opinion issued in PCT/GB2014/052772 dated Mar. 2, 2015.
"3GPP Technical Specification Group Services and System Aspects; Generic Authentication Architecture (GAA); Generic Bootstrapping Architecture (GBA) Push Function (Release 8)" Jun. 11, 2008.
International Search Report and Written Opinion issued in PCT/GB2014/052767 dated Jan. 23, 2015.
Nhon Chu et al. "OMA DM vl.x. Compliant Lightweight Device Management for Constrained M2M Devices" European Transactions on Telecommunications, Aug. 5, 2013, pp. 517-531.
International Search Report and Written Opinion issued in PCT/GB2014/052771 dated Jan. 23, 2015.
Musa Unmehopa "Management and Provisioning of M2M Devices for a Connected World" ETSI M2M Workshop, Oct. 26, 2011. Slides 8 and 10.
Nenad Gligoric et al. "Application-Layer Secuirty Mechanism for M2M Communication Over SMS" Telecommunications Forum, Nov. 20, 2012, pp. 5-8.
Office Action issued in U.S. Appl. No. 15/021,888 dated Feb. 27, 2018.
Office Action issued in U.S. Appl. No. 15/021,885 dated May 17, 2018.
Office Action issued in U.S. Appl. No. 15/021,873 dated May 18, 2018.
Office Action issued in U.S. Appl. No. 15/021,888 dated Oct. 2, 2018.
Office Action issued in U.S. Appl. No. 15/021,873 dated Oct. 4, 2018.
Office Action issued in U.S. Appl. No. 15/021,871 dated Jan. 2, 2019.
Office Action issued in U.S. Appl. No. 15/021,885 dated Jan. 23, 2019.
Meyerstein et al. "Security Aspects of Smart Cards in Machine-to-Machine (M2M) Advanced Mobile Network Applications" Jan. 2009.
Cha "Trust in M2M Communication" IEEE Vehicular Technology Magazine, Sep. 2009.

* cited by examiner

COMMUNICATING WITH A MACHINE TO MACHINE DEVICE

CROSS REFERENCE TO RELATED APPLICATIONS

This application is a U.S. Nationalization of PCT Application Number PCT/GB2014/052773, filed on Sep. 12, 2014, which claims priority to GB Patent Application No. 1414999.1, filed on Aug. 22, 2014, which claims priority to GB Patent Application No. 1409663.0, filed on May 30, 2014, which claims priority to GB Patent Application No. 1409643.2, filed on May 30, 2014, which claims priority to GB Patent Application No. 1409641.6, filed on May 30, 2014, which claims priority to GB Patent Application No. 1409652.3, filed on May 30, 2014, which claims priority to GB Patent Application No. 1318339.7, filed on Oct. 16, 2013, which claims priority to GB Patent Application No. 1316370.4, filed on Sep. 13, 2013, the entireties of which are incorporated herein by reference.

FIELD OF THE INVENTION

The present invention relates to a method and system for administering an interface between a machine to machine, M2M, device and a network application function, NAF, for secure communication between the M2M device and the NAF.

BACKGROUND OF THE INVENTION

Machine to Machine (M2M) devices are often numerous, hard-to-reach, and have constrained capabilities (owing to low cost, small size, low processing power or limited battery life). All of this makes their management, often remote, very complicated. Moreover, M2M devices often need to be managed in a secure manner. For example, they may contain information that is commercially sensitive and/or confidential for the one or more entities that manage and/or own said devices. There is a need to remotely manage them in a secure way, while respecting these constraints.

The M2M device needs to be able to contact a device management (DM) server in a secure manner. Whilst at the time of manufacture the device may be pre-provisioned with the necessary addresses and URLs to locate this DM server, this requires device suppliers to have knowledge about the device's end users. Furthermore, should the addresses or locations of the DM server change then the M2M devices will require updating to prevent communications from becoming lost or misdirected.

In order to establish secure communications with an M2M device, M2M devices may be provisioned with security information, for example a shared key(s). The security information may have an associated lifetime, during which it may be valid for use in administering a secure interface between, for example, the M2M device and a DM server or Network Application Function (NAF). Administering the interface may include registering the interface and/or updating an existing registration.

In addition to the security information having an associated lifetime, the secure interface registration may also have a lifetime, during which the interface may be used for secure communications, but after the expiry of which the interface may no longer be used for secure communications. New security information may therefore need to be re-bootstrapped from a bootstrapping server on a regular basis so that the security information remains valid and can be used for administering the interface.

It may be preferable regularly to administer the secure interface so that the secure interface registration does not expire and secure communications via the interface can continue uninterrupted. However, regular administration of the secure interface may generate additional data overheads for the M2M device and the DM server or NAF, and also for the bootstrapping server in the bootstrapping of new security information to be used in administration. Therefore, it may be desirable to achieve a balance between regular administration of the secure interface in order to maintain the secure interface, and minimising data overheads for the M2M device, DM server or NAF, and the bootstrapping server.

Details of 3GPP Standards and Technologies Used to Implement Aspects of the Method and System One of these architectures of 3GPP is a Generic Authentication Architecture (GAA), which is a complex of standards which is described, for example, in 3GPP TS 33.919 (entitled "3G Security; Generic Authentication Architecture (GAA); System description", currently it may be retrieved at http://www.3gpp.org/ftp/Specs/html-info/33919.htm).

Generic Bootstrapping Architecture (GBA) is a 3GPP standard defined in 3GPP TS 33.220 (entitled "Generic Authentication Architecture (GAA); Generic Bootstrapping Architecture (GBA)", it could be currently retrieved at http://www.3gpp.org/ftp/specs/html-info/33220.htm). GBA is part of the complex of standards called GAA (see above).

GBA is a standard which enables a shared secret to be derived (bootstrapped) from the existing security association between a mobile network and a SIM card. This involves a network element called a Bootstrapping Server Function (BSF). In other words, GBA leverages the security of a SIM card (UICC) to authenticate mobile equipment, and then derive key material for general-purpose applications.

GBA may be advantageously used to provide high-security to the communication between a client and the server, thus allowing remotely managing, controlling and, in general, communicating with a device in a high security manner. In particular, GBA (or a GBA-like architecture) is used for enabling a secure communication with the device (which, according to an aspect of the present disclosure, may be an M2M device), said communication being between a server and a client, the client being associated with the device, and wherein this communication is done for managing the device and/or services provided by (or via) the device, thus enabling a secure management of that device and/or the services provided by (or via) the device. In this way, the device and/or the services provided by (or via) the device can be safely, securely and efficiently managed in a remote manner via a remote server.

GBA has been developed mainly for securing mobile broadcast (e.g. pay TV and equivalents). Indeed, standards for Multimedia Broadcast Multicast Service (MBMS) rely on GBA. Similarly, Open Mobile Alliance (OMA) Mobile Broadcast Services Enabler Suite (BOAST) smartcard profile relies on GBA. To date, most of the limited number of deployments of GBA in the world has been for mobile broadcast. GBA has also been standardised as an optional feature in conjunction with presence services, and within miscellaneous "federated identity" services (e.g. Liberty Alliance, OpenID). In general, it is understood that GBA has been designed for use with mobile devices, such as mobile phones, laptop, computers, and many of the designed features have been provisioned with this in mind.

A variant of GBA, called "GBA Push", has been proposed for securing a message between a client and a DM server in the context of OMA Device Management Security. The OMA Device Management is specifically designed for management of mobile devices such as mobile phones, tablet, computers, etc.

A different recent standard document (TS 102 690) merely mentions, in the context of M2M communications, the use of a standard GBA to secure communications between a device/gateway service layer and a network service layer.

There are some alternatives for identifying/authenticating a mobile user/device to a service. All of these alternatives are simpler than using GBA. For example, mobile operators and service providers can use WAP header enrichment.

Alternatively, the service provider can request the user to enter their phone number, send an SMS one-time password to that phone number, and ask the user to read the SMS and enter the password. These alternatives all work well with mobile devices and operators already, so service providers use them, although they are not as secure as GBA.

Additionally, many service providers prefer to offer services to a huge range of mobile devices, many of which do not contain a SIM card (e.g. PCs, laptops, Wi-fi-only tablets etc.). Since GBA relies on a SIM card/UICC in order to work, there has been no interest in using it.

Strong security is not possible with current alternatives such as a user-entered PIN or a bootstrapping message delivered by an SMS. These alternatives would either not be feasible or they would not provide the required level of security. First, there might not be a user around to enter a PIN (as most M2M devices operate independently from human intervention). Second, the service provider may be likely to want strong security (e.g. because M2M devices may include critical infrastructure), whereas PIN-based bootstrapping has weaker security. Third, if a PIN or SMS-based bootstrapping goes wrong (server connects to wrong client, client connects to wrong server, or there is a Man-In-The-Middle), then the user is likely to notice, complain and get it fixed, whereas an M2M device is unlikely to notice and complain, so may be permanently compromised. Neither is particularly practical by way of existing methods. For example, the OMA Device Management uses GBA Push for securing a message between a client and a DM server, and there is no explanation of how a similar architecture could be used or even modified for managing the device. Moreover, as mentioned above, the OMA Device Management is not compatible for use with an M2M device, as discussed above. This is particularly true for low cost, simple M2M devices, such as simple sensors, switches, low cost trackers etc. Further, the standard document mentioned above uses a standard GBA to secure communications between a device/ gateway service layer and a network service layer. Thus, the communication is not used for device/service management-related communications, and it is not clear, based on the observations made above, how a similar architecture could be used or even modified for managing the device from the server. Moreover, for the reasons mentioned above, the OMA Device Management and the standard document are incompatible, and a combination of the GBA Push for OMA Device Management with the standard document is not feasible, as it would result in the wrong device management protocol (i.e. one that is not suitable for M2M devices, particularly simple M2M devices), and some very laborious effort to make the two compatible and delete the elements which are redundant.

The OMA has defined a lightweight protocol for managing (as well as interacting with) M2M devices and managing services provided by M2M devices (e.g. remote control of attached sensors or machines). This protocol is called LWM2M, which is described in detail at http://technical.openmobilealliance.org/Technical/release_program/lightweightM2M_v1_0.aspx This protocol runs over the CoAP protocol (analogous to http)—more specifically CoAP over DTLS (coaps) which is analogous to http over TLS (https). However, coaps requires a secure association to be provisioned between a device and a network server (DM Server) while providing no strong means to provision such an association from scratch.

A security aspect of OMA LWM2M is defined in Lightweight Machine to Machine Technical Specification Candidate Version 1.0—10 Dec. 2013 (OMA-TS-LightweightM2M-V1_0-20131210-C).

In addition, there exists two protocols, the first one called DTLS defined in RFC 6347 (entitled "Datagram Transport Layer Security Version 1.2"; it could be currently retrieved at http://tools.ietf.org/html/rfc6347); the second one called CoAP defined in draft-ietf-core-coap-18 (entitled "Constrained Application Protocol (CoAP)"; it could be currently retrieved at http://datatracker.ietf.org/doc/draft-ietf-core-coap/). Both protocols are currently used in LWM2M. CoAP is still only an IETF draft (not a full RFC), and DTLS version 1.2 is also comparatively new (January 2012): versions of TLS have often existed as RFCs for several years before receiving widespread adoption.

The User Datagram Protocol (UDP) channel security for [COAP] is defined by the Datagram Transport Layer Security (DTLS) [RFC6347], which is the equivalent of TLS v1.2 [RFC5246] for HTTP and utilizes a subset of the Cipher Suites defined in TLS. (Refers to TLS Cipher Suite registry http://www.iana.org/assignments/tls-parameters/tls-parameters.xml) The DTLS binding for CoAP is defined in Section 9 of [CoAP]. DTLS is a long-lived session based security solution for UDP. It provides a secure handshake with session key generation, mutual authentication, data integrity and confidentiality.

The keying material used to secure the exchange of information within a DTLS session may be obtained using one of the bootstrap modes defined in Section 5.1.2 Bootstrap Modes of OMA LWM2M. The formats of the keying material carried in the LWM2M Security Object Instances are defined in Appendix E.1.1.

There also exists an authentication protocol HTTP Digest authentication, which is defined in RFC 3310 (entitled "Hypertext Transfer protocol (HTTP) Digest Authentication using Authentication and Key Agreement (AKA)", it can currently be retrieved at http://www.ietf.org/rfc/rfc3310.txt).

The GAA cluster of specifications TS 33.222 (entitled "Generic Authentication Architecture (GAA); Access to network application functions using Hypertext Transfer Protocol over Transport Layer Security (HTTPS)") defines a general approach for pre-shared key TLS (TLS-PSK, RFC 4279). This can currently be retrieved at http://www.3gpp.org/ftp/Specs/html-info/33222.htm). For example, see especially Section 5.4.

In particular, with reference to GBA, 3GPP Specification TS 33.220 defines the components and interfaces that are shown in FIG. 1. These are further described as:

NAF 122, the "Network Application Function" is a server-side component of an application that will be secured using GBA.

BSF, "Bootstrapping Server Function", 130 is a server-side component, which obtains authentication vectors from the HLR/HSS 140, and sends a challenge to the mobile device, "UE", 110 during the GBA protocol. On successful authentication, it derives the shared secret.

HLR/HSS 140, the "Home Location Register" or "Home Subscriber System", is the existing 3GPP system which stores subscription details and credentials (the K and IMSI) for each SIM card (UICC) issued by a mobile operator. It may be "GBA-aware" (so that it stores details for a GBA user subscription) or may be a legacy component.

UE, the "User Equipment", 110 is a mobile device containing a SIM card (UICC). The UE 110 supports a client application which communicates with the NAF 122, as well as a service which interfaces to the UICC, communicates with the BSF 130, and derives the shared secret before passing it to the client application. This service is (somewhat confusingly) called a "GAA Server" in TR 33.905 (entitled "Recommendations for Trusted Open Platforms", it can currently be retrieved at http://www.3gpp.org/ftp/specs/html-info/33905.htm).

Ua 150 is the interface between the Mobile Device (UE) 110 and the Network Application Function (NAF) 120.

Ub 160 is the interface between the Mobile Device (UE) 110 and the Bootstrapping Server Function (BSF) 130. This is specified in detail in TS 24.109 (entitled "Bootstrapping interface (Ub) 160 and network application function interface (Ua) 150; Protocol details", it can currently be retrieved at http://www.3gpp.org/ftp/Specs/html-info/24109.htm).

Zh/Zh' 180 is the interface between the BSF 130 and the HSS or HLR 140. The Zh 180 interface is used with an HSS 140 that is "GBA Aware". The Zh' 180 interface is used with a legacy HLR or HSS 140. The Zh and Zh' 180 interfaces are specified in detail in TS 29.109 (entitled "Generic Authentication Architecture (GAA); Zh and Zn Interfaces based on Diameter protocol; Stage 3", it can currently be retrieved at http://www.3gpp.org/ftp/Specs/html-info/29109.htm) and TS 29.229 (entitled "Cx and Dx interfaces based on the Diameter protocol; protocol details", it can currently be retrieved at http://www.3gpp.org/ftp/Specs/html-info/29229.htm).

Zn 170 is the interface between the NAF 122 and the BSF 130: this can use either a Web Services protocol (SOAP over http) or the Diameter protocol (RFC 3588). This is specified in detail in TS 29.109 (see above).

There are a few other components and interfaces defined within the GAA standards, but these are not described in detail here.

There are several different versions of GBA defined in the standards. The flavours of GBA may include GBA-ME, GBA-U, GBA-SIM etc. The version called "GBA-ME" may require no special customizations of the UICC, except that the UICC does contain a 3G SIM (a USIM). However, other versions may be used. There may be a need to use the 2G variant of GBA (using a SIM rather than a USIM).

SUMMARY OF THE INVENTION

The present disclosure provides a method for a machine-to-machine, M2M, device (for example, a User Equipment device, UE) to administer an interface between the M2M device and a network application function, NAF, for secure communication between the M2M device and the NAF, wherein the M2M device comprises security information for enabling secure communication via the interface, the method comprising the steps of: setting a secure interface lifetime parameter based on a lifetime of at least part of the security information; and transmitting administration data to the NAF, wherein the administration data comprises the secure interface lifetime parameter.

Administering the interface may include establishing, or registering, secure communication over the interface, or maintaining the interface for secure communication (for example, updating an existing registration), or any other action that may be required to manage the interface itself.

The security information may comprise any data using which communication via the interface may be secure. For example, it may be any data that enables the interface to be made a secure interface. In some specific examples, the security information may comprise at least one of a secret or private key (for example, a Ks_NAF, or a key derived from the Ks_NAF) and/or a key identifier (for example, a B-TID/P-TID). Additionally, or alternatively, the security information may comprise a public key, such as a raw public key, RPK, and/or a certificate etc.

The secure interface lifetime parameter may be set to a time period for which the registration of the M2M device with the NAF should remain valid. In this way, the secure interface lifetime parameter sets a time limit for the lifetime of the registered secure interface between the M2M device and the NAF. The secure interface lifetime parameter may be the "Lifetime" parameter of a Register or Update operation, for example.

The lifetime of the security information may, for example, be a lifetime of the shared secret (for example, Ks_NAF) and/or a lifetime of an identifier of the shared secret (for example, B-TID/P-TID), and/or a certificate and/or a public key lifetime etc. The secure interface lifetime parameter may be based on the remaining lifetime of the security information at the time of setting the secure interface lifetime parameter, or based on the value to which the lifetime of the security information was initially set, or based on the lifetime of the security information in some other way.

In addition to the secure interface lifetime parameter, the administration data may optionally include any other data that may be required for the administration of the interface. For example, it may comprise a name for the M2M device, for example an "Endpoint Client Name", using which the M2M device can be identified, for example by NAF and/or the bootstrapping server function (BSF) and/or security information that can be used in securing the interface, such as a security key, and/or certificate, and/or key identifier, and/or a "Binding Mode" parameter and/or an "SMS Number" parameter etc.

By setting the secure interface lifetime parameter based on a lifetime of the security information, the lifetime of the secure interface is linked to the lifetime of the security information. By linking the two lifetimes, the number of unnecessary new bootstrapping runs (for example, new bootstrapping runs that are unnecessary because there is still a large amount of time remaining before the secure interface registration expires) may be reduced or eliminated, thereby reducing the data overhead of the M2M device and/or a bootstrapping server. Furthermore, the M2M device and NAF data overheads may also be reduced as administration data may only be transmitted when there is new administration data (for example, a newly bootstrapped shared secret and/or a new identifier of the shared secret), thereby reducing or eliminating unnecessary data transfers between the M2M device and NAF for updating or refreshing the interface unnecessarily.

Furthermore, it may enable the bootstrapping server to exercise some control over the secure interface lifetime parameter (and therefore the allowable registration lifetime of the secure interface). The bootstrapping server may therefore influence the value of the secure interface lifetime parameter based on its knowledge of how long particular devices can be expected to keep secrets, how secure particular devices are, what type of secure card the device contains, what threats the device faces etc. The bootstrapping server may also be able to exercise load balancing, for example to space out re-bootstrapping requests, update requests etc.

The secure interface lifetime parameter may be set to a value greater than or equal to the lifetime of the at least part of the security information. Alternatively, the secure interface lifetime parameter may be set to a value greater than the lifetime of the security information by a first amount.

This means that the M2M device may identify that the lifetime of the security information has expired, or is close to expiry, before the existing secure interface expires. It may then attempt a new bootstrapping run before the registered secure interface expires, thereby making it possible to obtain new bootstrapped data and set up a new secure interface, or refresh the existing secure interface, before the existing secure interface expires.

Alternatively, the secure interface lifetime parameter may be set to a value less than or equal to the lifetime of the at least part of the security information, or less than the lifetime of the security information by a second amount. For example, in some scenarios, the security information may comprise a key or keys that are themselves used over the secure interface (rather than, as in DTLS, used to negotiate new keys). In this case, it is preferable to avoid using the keys for longer than their lifetime, so it may be preferable to set the secure interface lifetime parameter to a value that is less than or equal to the lifetime of the at least part of the security information.

The method may further comprise the steps of checking the remaining lifetime of the at least part of the security information; and if the remaining lifetime of the at least part of the security information is less than a security information lifetime threshold, requesting new security information from a bootstrapping server.

By way of example, the security information lifetime threshold may be 18 hours. Because the secure interface lifetime parameter is set based on the security information lifetime, the secure interface lifetime parameter may be set such that when there are only 18 hours remaining on the security information lifetime, the secure interface is still valid (i.e. the secure interface lifetime parameter is still greater than zero, and optionally greater than 18 hours if the secure interface lifetime parameter has been set to be greater than the security information lifetime parameter). If the remaining lifetime of the security information is less than 18 hours, the M2M device may attempt to obtain new security information from the bootstrapping server, such that new security information can be obtained from the bootstrapping server before the secure interface between the M2M device and NAF expires.

The method may further comprise a step of: if the request for new security information fails (for example, because the bootstrapping server cannot be reached at that moment), repeating the request for new security information after a period of time. The period of time may be set in consideration of the secure interface lifetime parameter, the security information lifetime and/or the security information lifetime threshold such that multiple attempts may be made to obtain new security information before the secure interface registration between the NAF and M2M device expires.

The step of checking the remaining lifetime of the security information may be carried out before a secure communication transmission from the M2M device to the NAF via the interface. By doing this, the M2M device may identify that new security information should be obtained (for example, because the existing security information has expired or is close to expiry) before attempting to communicate with the NAF via the secure interface. This can improve efficiency as the M2M device can proactively obtain new security information, rather than simply attempting to connect with the NAF via an expired secure interface and then only obtain new security information after receiving an error message from the NAF.

The administration data may further comprise a name for the M2M device, wherein the name for the M2M device is equal to, or derived at least in part from, or otherwise linked to (for example, a linkage via database look-ups, such as at a BSF, or a NAF, or in a database accessed by either of them) at least part of data that are shared between the M2M device and a bootstrapping server (for example, a BSF).

The data that are shared between the M2M device and bootstrapping server can be any data that is known to both entities. For example, it may comprise at least one of an identifier of a shared secret (for example, a B-TID or P-TID), a shared secret (for example, a Ks_NAF), data that may be used for the derivation of a shared secret (for example, at least one of a "nonce", "RAND", "AUTN", "CK|IK"), an identifier of the M2M device (for example an IMPI, TMPI, IMSI, TMSI), etc.

The name for the M2M device may be equal to at least part of the data that are shared between the M2M device and bootstrapping server. For example, it may be the same as the identifier of the shared secret (B-TID/P-TID), or the same as a part of the identifier of the shared secret, or the same as an identifier of the M2M device (such as the TMPI), or the same as a part of an identifier of the M2M device, etc.

Alternatively, the name for the M2M device may be derived, at least in part, from at least part of the data that are shared between the M2M device and the bootstrapping server. For example, it may be a transformation of at least part of the data that are shared between the M2M device and the bootstrapping server (for example, a hash, or any other form of modification, of at least part of one or more of the items of data shared between the M2M device and the bootstrapping server), or a concatenation of at least part of two or more of the items of data shared between the M2M device and the bootstrapping server, etc.

By setting the name of the M2M device in this way, underlying private identifiers of the M2M device may be disguised. For example, if the name of the M2M device is set to at least part of the TMPI (which anonymises the TMSI), or to at least part of the B-TID/P-TID (which are randomly generated to disguise the shared secret), the underlying private identifiers (the TMPI and/or shared secret) are not revealed in the name for the M2M device. It will be readily apparent that this is also true for when the name for the M2M device is derived, at least in part, from at least part of the data that are shared between the M2M device and the bootstrapping server.

By setting the name of the M2M device to a value that disguises underlying private identifiers of the M2M device, the privacy of the M2M device and/or any people or entities that are associated with the M2M device may be maintained.

The method may further comprise the M2M device itself deriving the name for the M2M device at least in part from at least part of the data that are shared between the M2M device and the bootstrapping server.

In an alternative, the bootstrapping server may derive the name for the M2M device at least in part from at least part of the data that are shared between the M2M device and the bootstrapping server (or set the name for the M2M device to be equal to at least part of the data that are shared between the M2M device and the bootstrapping server) and transmit the name for the M2M device to the M2M device (for example, in response to a request from the M2M device and/or as part of a bootstrapping process). In a further alternative, the bootstrapping server and the M2M device may both set, or derive, the name for the M2M device, such that they both have the name for the M2M device without it having to be transmitted between each of them.

Preferably, the name for the M2M device is linked to at least a part of the data that are shared between the M2M device and a bootstrapping server and the administration data further comprises a data element equal to or derived from the at least part of the data that are shared between the M2M device and a bootstrapping server to which the name for the M2M device is linked.

For example, the name for the M2M device may be linked to an identifier (such as B-TID or P-TID) of the shared secret and/or to an identifier of the M2M device (for example, a "UE-Id", such as the MSISN, or IMSI, or IMPI, or IMPU etc). The name for the M2M device may have been set to equal, or been derived at least in part from, at least part of one of the items of data shared between the M2M device and the bootstrapping server, and be linked to a different item of data shared between the M2M device and the bootstrapping server. Alternatively, the name for the M2M device may be derived, at least in part, from at least part of the shared data, and the derived name for the M2M device may be linked to at least the part of the shared data that was used to derive the name for the M2M device. Alternatively, the name of the device may be linked to some secret data, such as a Ks (for example, using a database at the BSF). It is preferable not to pass the Ks itself as part of the administration data, thus the administration data may comprise a data element derived from the Ks, for example a part of or a hash of Ks. Alternatively, the administration data could contain part of or something derived from Ks_NAF (which has been derived from Ks).

Alternatively, or in addition, the name for the M2M device may be linked to at least a part of the data that are shared between the M2M device and the bootstrapping server by, for example, storing at the bootstrapping server and/or the NAF and/or at a location accessible by the bootstrapping server and/or the NAF, the name for the M2M device and the at least part of the data shared between the M2M device and the bootstrapping server (or a data element derived therefrom), to which the name for the M2M device is linked, with an association/linkage recorded between the two (for example, using a database linkage etc).

The data that are shared between the M2M device and the bootstrapping sever may comprise security information for enabling secure communication via the interface.

The security information may comprise at least one of a secret or private key (for example, a Ks or Ks_NAF, or a key derived from the Ks_NAF) and/or a key identifier (for example, a B-TID/P-TID). Additionally, or alternatively, the security information may comprise a public key, such as an RPK, and/or a certificate etc.

The interface between the M2M device and the NAF may be a device management interface.

The interface between the M2M device and the NAF may be a Lightweight M2M, LWM2M, interface.

The administration data may be transmitted to the NAF as at least part of a Register operation or as at least part of an Update operation.

The interface between the M2M device may alternatively utilise the CoAP protocol and/or the LWM2M protocol or any other suitable protocol.

The method may be based on a Generic Authentication Architecture, GAA, in particular on a Generic Bootstrapping Architecture (GBA).

The present disclosure also provides an M2M device (for example, a User Equipment device, UE) comprising logic configured to perform the above disclosed method.

The present disclosure also provides a method for a network application function, NAF, to administer an interface between the NAF and a machine-to-machine, M2M, device, (for example, a User Equipment device, UE) wherein the M2M device comprises security information for enabling secure communication via the interface, the method comprising the steps of: receiving administration data from the M2M device, the registration data comprising a secure interface lifetime parameter that has been set based on a lifetime of at least part of the security information; and transmitting an administration response to the M2M device.

The administration response may indicate that the administration data from the M2M device has been successful (for example, successful in setting up a new registered secure interface, or in updating an existing secure interface), or it may indicate that the administration data has failed (for example, a new registered secure interface has not been successfully established, or an existing secure interface has not been successfully updated).

Because the secure interface lifetime parameter is set based on a lifetime of the security information, the lifetime of the secure interface is linked to the lifetime of the security information. By linking the two lifetimes, the number of unnecessary new bootstrapping runs (for example, new bootstrapping runs that are unnecessary because there is still a large amount of time remaining before the secure interface registration expires) may be reduced or eliminated, thereby reducing the data overhead of the M2M device and/or a bootstrapping server. Furthermore, the M2M device and NAF data overheads may also be reduced as administration data may only be transmitted when there is new administration data (for example, a newly bootstrapped shared secret and/or a new identifier of the shared secret), thereby reducing or eliminating unnecessary data transfers between the M2M device and NAF for updating or refreshing the interface unnecessarily.

Furthermore, it may enable the bootstrapping server to exercise some control over the secure interface lifetime parameter (and therefore the allowable registration lifetime of the secure interface). The bootstrapping server may therefore influence the value of the secure interface lifetime parameter based on its knowledge of how long particular devices can be expected to keep secrets, how secure particular devices are, what type of secure card the device contains, what threats the device faces etc. The bootstrapping server may also be able to exercise load balancing, for example to space out re-bootstrapping requests, update requests etc.

The method may further comprise checking the lifetime of the at least part of the security information; and comparing the secure interface lifetime parameter with the lifetime of the at least part of the security information; wherein if the comparison does not meet a comparison condition, the registration response is set to indicate an error in the registration data.

The comparison condition may be that the secure interface lifetime parameter is greater than or equal to the lifetime of the at least part of the security information, or it may be that the secure interface lifetime parameter is greater than the lifetime associated with the at least part of the security information, or it may be that the secure interface lifetime parameter is greater than the lifetime associated with the at least part of the security information by a first amount.

Alternatively, the comparison condition may be that the secure interface lifetime parameter is less than or equal to the lifetime of the at least part of the security information, or it may be that the secure interface lifetime parameter is less than the lifetime associated with the at least part of the security information, or it may be that the secure interface lifetime parameter is less than the lifetime associated with the at least part of the security information by a second amount. For example, in some scenarios, the security information may comprise a key or keys that are themselves used over the secure interface (rather than, as in DTLS, used to negotiate new keys). In this case, it is preferable to avoid using the keys for longer than their lifetime, so it may be preferable to set the secure interface lifetime parameter to a value that is less than or equal to the lifetime of the at least part of the security information.

Thus, the NAF can check that the secure interface lifetime parameter compares in an expected way with the lifetime of the security information (which may be the remaining lifetime of the security information, or the value to which the lifetime of the security information was initially set). If they do not compare in an expected way, this may indicate a fault in the administration process (for example, because the M2M device has made a mistake, or it is acting in a malicious manner etc), and the NAF may terminate the administration process (for example, a registration or update process) and return an error message to the M2M device.

The method may further comprise the NAF obtaining the lifetime of the at least part of the security information. The lifetime of the at least part of the security information may be obtained from a bootstrapping server by transmitting the at least part of the security information (or an identifier for the at least part of the security information, for example the B-TID) and requesting that the remaining lifetime be returned. Alternatively, the NAF may obtain the remaining lifetime from its own records (for example, the NAF_SA, or from other records that it stores on the NAF or in a location accessible to the NAF). Alternatively, it may obtain the remaining lifetime from any other suitable source.

The administration data may further comprise a name for the M2M device, wherein the name for the M2M device is equal to, or derived at least in part from, or otherwise linked to, at least part of data that are shared between the M2M device and the bootstrapping server (for example, a BSF).

Because the name of the M2M device is equal to, or derived at least in part from, or otherwise linked to, at least part of data that are shared between the M2M device and the bootstrapping server, underlying private identifiers of the M2M device may be disguised. For example, if the name of the M2M device is set to at least part of the TMPI (which anonymises the TMSI), or to at least part of the B-TID/P-TID (which are randomly generated to disguise the shared secret), the underlying private identifiers (the TMPI and/or shared secret) are not revealed in the name for the M2M device. It will be readily apparent that this is also true for when the name for the M2M device is derived, at least in part, from at least part of the data that are shared between the M2M device and the bootstrapping server. Therefore, the NAF and/or any other entities that may legitimately, or illegitimately, have sight of the administration data, will not be able to determine the underlying private identifiers from the name for the M2M device.

Therefore, by setting the name of the M2M device to a value that disguises underlying private identifiers of the M2M device, the privacy of the M2M device and/or any people or entities that are associated with the M2M device may be maintained.

The administration data may comprise a data element equal to or derived from at least a part of the data that are shared between the M2M device and the bootstrapping server and the method may further comprise a step of: checking that the name for the M2M device and the received data element are linked to each other, via at least part of the data that are shared between the M2M device and the bootstrapping server, wherein if the name for the M2M device and the received data element are not linked to each other, the administration response is set to indicate an error in the administration data.

For example, the name for the M2M device may be linked to an identifier (such as B-TID or P-TID) of the shared secret and/or to an identifier of the M2M device (for example a "UE-Id", such as the MSISN, or IMSI, or IMPI, or IMPU etc). The name for the M2M device may have been set to equal, or been derived at least in part from, at least part of one of the items of data shared between the M2M device and the bootstrapping server, and be linked to a different item of data shared between the M2M device and the bootstrapping server. Alternatively, the name for the M2M device may be derived, at least in part, from at least part of the shared data, and the derived name for the M2M device may be linked to at least the part of the shared data that was used to derive the name for the M2M device.

The name for the M2M device may be linked to at least a part of the data that are shared between the M2M device and the bootstrapping server by, for example, storing at the bootstrapping server and/or the NAF and/or at a location accessible by the bootstrapping server and/or the NAF, the name for the M2M device and the at least part of the data shared between the M2M device and the bootstrapping server, to which the name for the M2M device is linked, with an association/linkage recorded between the two (for example, using a database linkage etc).

The NAF may check the linkage of the name for the M2M device to the received data element (expected to be equal to or derived from at least part of the data that are shared between the M2M device and the bootstrapping server) in a variety of ways. The NAF may pass the two items to the bootstrapping server, which may check its records (stored either on the bootstrapping server, or at a location accessible to the bootstrapping server) to determine whether or not a linkage between the two has been stored. It may then return a result to the NAF indicating whether or not the two items have been linked to each other. Alternatively, the NAF may pass one of the name for the M2M device or the received data element (expected to be equal to or derived from at least part of the shared data to the bootstrapping server). The bootstrapping server may check its records and return to the NAF the item that is linked in its records to the data that the NAF passed to the bootstrapping server (i.e. the name for the M2M device or data element equal to or derived from the at least part of the shared data to which the name is linked). The NAF may then determine for itself whether the item returned to it by the bootstrapping server matches the data it received from the M2M device in the administration data. In a further alternative, in response to receiving the data element (expected to be equal to or derived from at least part of the shared data) from the NAF, the bootstrapping server may return linked data from which the name for the M2M device can be derived. The NAF may then derive a name for the M2M device from the data and check that it matches the name for the M2M device that it received in the administration data.

In a further alternative, the NAF may perform an analogous process to that identified above, but rather than transmitting and receiving data from the bootstrapping server, it may instead interrogate its own records (kept on the NAF and/or at a location accessible to the NAF) to determine if the name for the M2M device and the data element are correctly linked.

If the items are correctly linked, the NAF can verify that the data received in the administration data is correct, and proceed with registering or updating the secure interface. If it is determined that the items are not linked, the NAF will cease to register or update the secure interface and may transmit a failure message to the M2M device.

The data that are shared between the M2M device and the bootstrapping server may comprise security information for enabling secure communication via the interface.

The security information may comprise at least one of a secret or private key (for example, a Ks_NAF, or a key derived from the Ks_NAF) and/or a key identifier (for example, a B-TID/P-TID). Additionally, or alternatively, the security information may comprise a public key, such as an RPK, and/or a certificate etc.

The methods may be based on a Generic Authentication Architecture, GAA, in particular on a Generic Bootstrapping Architecture (GBA).

The connection between the M2M device and the NAF may utilise the CoAP protocol and/or the LWM2M protocol or any other suitable protocol.

The present disclosure also provides a network application function, NAF, comprising logic configured to perform the above disclosed method.

The NAF may be any server or network component that terminates secure communication on an interface between the NAF and the M2M device.

The NAF may be configured as a proxy to sit between the M2M device and a device management server (DM server) and/or as a proxy to sit between the M2M device and a LWM2M server and/or as a proxy to sit between the M2M device and a LWM2M bootstrapping server and/or as a proxy to sit between the M2M device and a bootstrapping server.

The NAF may additionally, or alternatively, be configured as a router to sit between the M2M device and the DM server and/or as a router to sit between the M2M device and a LWM2M server and/or as a router to sit between the M2M device and a LWM2M bootstrapping server and/or as a router to sit between the M2M device and a bootstrapping server. In this way, the NAF may pass any suitable traffic on to the DM server/LWM2M server/LWM2M bootstrapping server/bootstrapping server either encrypted or unencrypted such that the functionality of the server/LWM2M server/LWM2M bootstrapping server/bootstrapping server need not be modified in any way and the server/LWM2M server/LWM2M bootstrapping server/bootstrapping server does not need to be 'GBA aware'.

The present disclosure also provides a device management server (DM server) comprising the NAF of the present disclosure. For example, the NAF may be a plug-in component in the DM server, or the NAF may be the DM server itself (i.e. the NAF is identical to the DM server). The present disclosure also provides a LWM2M server comprising the NAF of the present disclosure. For example, the NAF may be a plug-in component in the LWM2M server, or the NAF may be the LWM2M server itself (i.e. the NAF is identical to the LWM2M server). The present disclosure also provides a LWM2M bootstrapping server comprising the NAF of the present disclosure. For example, the NAF may be a plug-in component in the LWM2M bootstrapping server, or the NAF may be the LWM2M bootstrapping server itself (i.e. the NAF is identical to the LWM2M bootstrapping server). The present disclosure also provides a bootstrapping server comprising the NAF of the present disclosure. For example, the NAF may be a plug-in component in the bootstrapping server, or the NAF may be the bootstrapping server itself (i.e. the NAF is identical to the bootstrapping server).

The present disclosure also provides a system comprising the above disclosed M2M device and NAF.

The methods described above may be implemented as a computer program comprising program instructions to operate a computer. The computer program may be stored on a computer-readable medium.

The computer system may include a processor such as a central processing unit (CPU). The processor may execute logic in the form of a software program. The computer system may include a memory including volatile and non-volatile storage medium. A computer-readable medium may be included to store the logic or program instructions. The different parts of the system may be connected using a network (e.g. wireless networks and wired networks). The computer system may include one or more interfaces. The computer system may contain a suitable operation system such as UNIX, Windows® or Linux, for example.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which.

It should be noted that the figures are illustrated for simplicity and are not necessarily drawn to scale. Like features are provided with the same reference numerals.

DETAILED DESCRIPTION OF THE PREFERRED EMBODIMENTS

Figure 1:
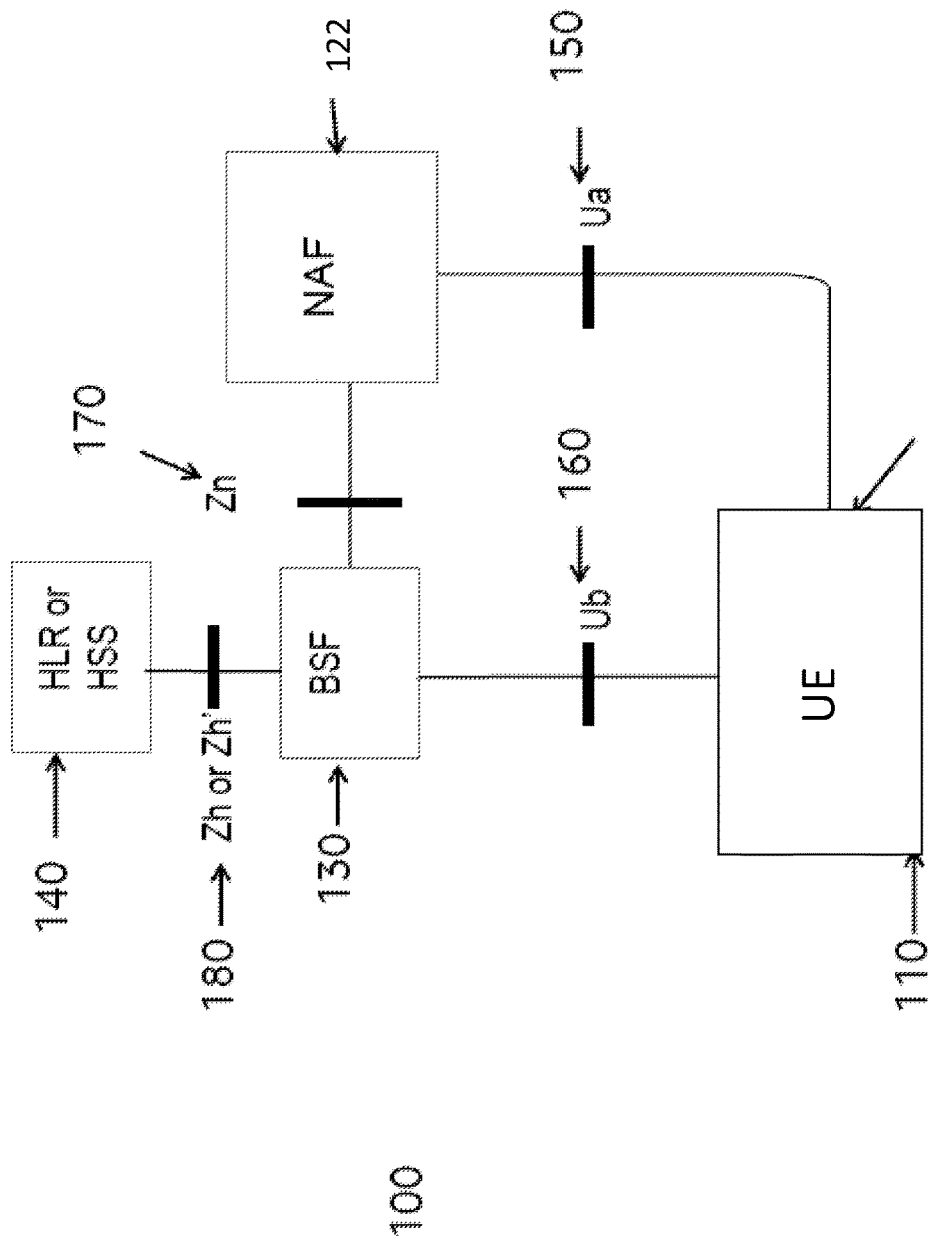
FIG. 1 shows a schematic diagram of components and interfaces with which GBA may be used.

A device may communicate securely with a server. The device may be a Machine to Machine (M2M) device, or an equivalent device (e.g. a device, a generic or specific communication device, including one or more modules capable of providing M2M capabilities).

Aspects of the Generic Authentication Architecture (GAA) and Generic Bootstrapping Architecture (GBA) are identified in "Details of 3GPP standards and technologies used to implement aspects of the method and system" above. In particular, the specific architecture on which the method and system may be based is GBA.

Generic Bootstrapping Architecture (GBA) uses existing security associations between a network (e.g. a mobile network) and a card (e.g. a SIM card or UICC) to derive a key that can be used for the secure communication between the client and the server. Accordingly, if the device is associated with such a card, as well as with the client, the method can advantageously use the GBA to derive the security elements (e.g. a shared secret) to enable the client associated with the device to securely communicate with the server. Accordingly, the device could be advantageously adapted so that it is associated with the card and the client and uses GBA to derive the security elements for secure communication with the server. Moreover, as GBA is standards-based, the impact of the required modifications may be relatively limited and the overall solution would be very attractive (in particular, to M2M users/owners as well as to network operators and/or service providers).

M2M devices are different from the mobile devices that OMA Device Management was originally designed for (such as mobile phones, laptops, computers, as explained in "Details of 3GPP standards and technologies used to implement aspects of the method and system" above), and use of GBA (in any of its versions) with M2M is not a straightforward implementation.

A variant of GBA, called "GBA Push" has been proposed for securing a message between a client and a DM server in the context of OMA Device Management Security, and is identified in "Details of 3GPP standards and technologies used to implement aspects of the method and system" above. It is noted that, although GBA Push and GBA are related, it is not trivial to use GBA in place of GBA Push (and vice versa). This is because these two architectures have some important differences. First, in GBA the device has to contact the BSF in order to request a RAND and AUTN (and use this to derive a Ks_local). To the contrary, in GBA Push, the client does not have to talk to the BSF—it just receives a message prepared by the BSF. Furthermore, in GBA, there is no need to modify the Ua interface. In GBA Push, either the Ua interface has to be modified in some way to carry the push message or a new interface must be added. Accordingly, GBA Push cannot be used with an arbitrary application protocol. For GBA Push, the application protocol has to be "GBA aware" in some sense (e.g. so it can carry the GBA Push Info (GPI) messages). In GBA, the Ks_local can be used to derive several different Ks_NAFs (e.g. for different application servers). In GBA Push, only one NAF can use/rely on the Ks_local. Accordingly, GBA Push is slightly less efficient than GBA.

The GBA Push Info is described in 3GPP TS 33.223, Section 5.2.1. The encoding is defined in Section 5.3.5. See in particular table 5.2.1.1 and FIG. 5.3.5.1 in 3GPP TS 33.223 V12.0.0 (2013-12) that may be found: http://www.3gpp.org/ftp/Specs/archive/33_series/33.223/33223-c00.zip Moreover, as discussed above, M2M devices are very constrained in their capabilities (e.g. computation, communication, life, etc.) and these constraints make their management more complex and harder to implement in a simple manner. GBA requires a number of interfaces and components which are hard to implement with M2M (for examples and description of these interfaces and components, please refer to the sections below).

In order to more efficiently and securely manage the device and/or services provided by (or via) the device, these interfaces and components need to be modified or otherwise adapted so they can properly and effectively work with M2M devices.

For example, carrying the Ub interface (and associated protocol) over constrained M2M devices is very difficult. For example, the standard Ub interface uses HTTP and HTTP digest. The likely rationale for this is that, as mentioned above, GBA was designed having mobile devices, such as mobile phones, in mind. So, since all phones use HTTP, and therefore all have an HTTP stack, then HTTP was the easiest protocol to be used for the Ub interface. However, this is not true for M2M devices. For example, according to the Lightweight M2M (LWM2M) protocol (see below for more details), a protocol called CoAP is used in M2M devices, precisely because it is a simpler/more efficient alternative to HTTP. Alternatively, this Ub interface could be tunnelled, for example via another interface (e.g. the Ua), so that the system may be simplified.

Additionally, building all the necessary components (e.g. GAA server, interfaces) into a capacity-constrained M2M device appears to be very difficult. For example, physical and virtual space constraints, as well as computational constraints, create considerable problems for building the necessary components. Moreover, having one or more interfaces between M2M application(s) and a card on the device, such as a UICC, is very difficult. This is due, for example, to the fact that most M2M modems do not support the required low level interface(s). In general, the overall integration of the GBA required interfaces and components with an M2M device appear very difficult. A possible, but not optimal solution, could be to pre-provision the M2M devices (e.g. having the M2M devices already designed and/or manufactured with the required components and interfaces) and the associated elements required for use of GBA (e.g. the card being capable of interfacing with the M2M device) so that the GBA could be used. To date, no M2M device is pre-provisioned with these characteristics.

In addition, as noted above, GBA is not widely used. There are other reasons why GBA is not widely used. For example, use of GBA requires support in the device, in the network (e.g. BSF—see below) and by individual services (which may be deployed, for example, by a mobile operator or by other parties). In the preferred use-case (mobile broadcast) support is also required in the SIM card (as it uses GBA-U). Accordingly, a lack of coordination and willingness to act/cooperate between the various parties involved in this deployment (e.g. device manufacturers, mobile operators, service providers) has so far blocked implementation of GBA.

For all the above reasons, GBA (or a GBA-like architecture, for example a variant and/or a suitably modified version) may be used for enabling a secure communication with a device (in particular, an M2M device). The communication may be between a server and a client, the client being associated with the device, and wherein this communication may be done for managing the device and/or services provided by (or via) the device. This enables a secure management of that device and/or the services provided by (or via) the device and creates a new and innovative combination which produces a synergistic effect and provides many technical advantages.

For instance, as already mentioned above, the GBA will provide a higher and very strong level of security to the device/service management-related communications with M2M devices, which is a very critical and important point.

Another advantage, in addition or combined with the strong security described above, is in terms of full automation. Moreover, an M2M service provider does not have the cost/complexity of setting up their own security solutions, as the solution can be provided directly by the mobile operator implementing the solution described in this application. In particular, a service provider does not have to set up a PKI, issue certificates, pre-load keys to devices and so on.

Accordingly, the method may further comprise that the provision of the secure communication is based on a security association between a network and a card, the card being associated with the device. For example, the card may be embedded within the device (e.g. soldered in the device) or provided to the device by way of a suitable connection. In general, the card may be associated in any suitable manner so that there is an association between the card and the device. The network can be a mobile network, or any equivalent network, while the card can be a SIM card, a UICC, or any card associated with the network. The method may further comprise deriving a shared secret based on the security association. The method may further comprise providing the client and the server with the shared secret so as to enable the secure communication. The server may be a server adapted to manage the device (e.g. remotely manage the device, send updates, transfer information to and from the device, control device parameters, etc.) and to manage services provided by the device (e.g. device is used to switch on/off and/or dim streetlights). The shared secret may be a key and/or a similar security arrangement.

The method may further comprise authentication between the client and the server. The authentication may be based on the shared secret. The authentication may be performed via an authentication component. The authentication may be performed by means of a first authentication between the client and an authentication component and of a second authentication between the server and the authentication component. The client and the server may be independently authenticated by an authentication component. As a result of the client and the server being authenticated by the authentication component, both the client and the server may share the shared secret. The authentication may be performed by means of the shared secret. The shared secret may be shared between the client and the server. Alternatively, the shared secret may be shared between the client, the server and the authentication component. The authentication may implicitly result from the client, the server and the authentication component sharing the shared secret. The method may further comprise deriving a second shared secret based on the shared secret, the second shared secret being shared between the client and the server. This second shared secret may then be used for the authentication as discussed above.

The obtainment of the shared secret at the client may be based on an identifier associated with a server authentication component. The shared secret may be obtained at the server from the authentication component. The obtainment of the shared secret at the server is obtained based on an identifier associated with the shared secret. The identifier is generated by the authentication component. The identifier may be provided to the server by the client.

The OMA LWM2M protocol for managing (as well as interacting with) M2M devices and managing services provided by M2M devices (as described in "Details of 3GPP standards and technologies used to implement aspects of the method and system") may be used. However, other device management protocols may be used or the method and system may be extended to other M2M services (for example, securing the delivery of binary SMS).

GBA could be advantageously used in conjunction with LWM2M in order, for example, to establish keys for LWM2M, whilst at the same time LWM2M and the procedures specified therein could be used to transport and/or carry any message and/or communication which relates to GBA. For example, this can be done by using specific tunnels (e.g. Ub) or GBA Push Info (GPI) messages. The use of GBA together with LWM2M creates a new and innovative combination which produces a synergistic effect and provides many technical advantages. For example, it allows addressing many more low-end devices, such as M2M devices. This is due, for example, to the use of a device management protocol which is properly optimized for M2M, rather than one repurposed from the consumer space (e.g. OMA DM v1, TR-069). This optimised protocol can be used to transport GBA messages—avoiding the need for a separate HTTP stack—and to manage GBA parameters (identifiers for device and application, lifetimes, key derivation methods, etc.). Further, when accompanied by appropriate network systems to provide automated routing and discovery (e.g. of LWM2M server and BSF), GBA and LWM2M advantageously combine to eliminate the cost of pre-loading settings and credentials, so facilitating low cost devices. GBA with LWM2M securely supports low-cost devices which are unattended or have no UI, where there is no option for user interaction (such as entry of PIN), and where there is no user who is able to notice and recover from authentication failures (spoof server, spoof client or Man In The Middle), Moreover, GBA works without requiring any public key or certificate processing on the device. This is particularly advantageous on simpler devices, as these devices may have minimal public key support or implementation errors when handling certificates.

Accordingly, the shared secret may be used as a key in the LWM2M standard. Also, the LWM2M standard procedures may be used for transmission and/or reception of any communication used within the GBA.

The shared secret may be used as a key or shared secret within the DTLS protocol (identified in "Details of 3GPP standards and technologies used to implement aspects of the method and system" above), either when the LWM2M is used in conjunction with a DTLS protocol or when the DTLS is used alone or in conjunction with one or more other protocols.

The secure communication may further be a data communication. The data communication may be an SMS-based communication. An SMS binding may be used. The data communication may be a UDP-based communication.

The method may further comprise encrypting a communication over the secure data communication. The encryption may be performed using an Advanced Encryption Standard. The SMS-based communication may be further secured by use of an Over-The-Air (OTA) protocol, e.g. a Secured Packet Structure for UICC Applications. This protocol is defined in ETSI standard 102.225. The OTA protocol may be arranged to secure the communication with the identification card associated with the device.

It has also been noted that the OTA protocol can be used advantageously in conjunction with the LWM2M standard, in which the LWM2M can be used to manage parameters, keys and similar elements for the OTA protocol.

The use of OTA with LWM2M is not a straightforward implementation. OTA is a solution designed for SIM card security, as it has some real technical challenges if used for LWM2M. In particular, while there is software written for SIM cards and SIM OTA servers to support ETSI standard 102.225, a similar software does not exist in the device management space for devices (and, in particular, not for OMA DM clients and servers).

Thus, M2M device manufacturers do not have a codebase that they can easily adapt for use with these devices.

Further, the ETSI standard 102.225 does not explain how to set up the keys and parameters for use with the standard. It simply assumes the keys and parameters are all pre-loaded and known to both SIM card and OTA server. Although this assumption is acceptable in the SIM space—because SIM cards can be securely provisioned with the necessary keys at the manufacturing stage, and SIM manufacturers have interfaces with operators for communicating the necessary keys and parameters—the same cannot be said about LWM2M, where that infrastructure does not exist.

Thus, the use of OTA together with LWM2M creates a new and innovative combination which produces a synergistic effect and provides many technical advantages. For example, the SMS bearer needs to be secured, and so far no solution has been found. Use of OTA enables the SMS bearer to be used in LWM2M. Without it, it would not be possible to use SMS-based communications in LWM2M, and that would limit the applicability of the overall LWM2M standard.

Accordingly, the LWM2M standard procedures may be used to manage parameters and/or keys used in the OTA protocol. The method may further be used in conjunction with LWM2M, as described above.

It has also been noted that the method described above, implemented using the GBA (or a similar architecture), can be used in conjunction with SMS so that the GBA can be employed to establish keys for secure SMS-based communications (e.g. SMS), while at the same time SMS-based communications can be used to transport or carry messages associated with GBA—for example, carry GBA Push Info (GPI) messages. The use of SMS-based communications together with GBA creates a new and innovative combination which produces a synergistic effect and provides many technical advantages. For example, GBA can be used to establish the shared keys that are needed to protect SMS, while using SMS as a transport to deliver the necessary GBA messages. Further the SMS used to deliver the GBA messages can themselves be integrity protected (and partly encrypted) using the keys that will be established by GBA, so at no point is there a reliance on not secure SMS. This synergistic combination allow use of SMS as the sole bearer for M2M traffic, something which would not otherwise be possible, except by preloading the keys needed to secure SMS traffic, or switching to a different protocol to negotiate these keys: both of these alternatives would add complexity and cost. Thus, it would provide a very high security solution for obtaining shared keys so that the security of the keys is not compromised, and at the same time an-SMS-based communication is enabled by virtue of the provisioning of the keys.

Accordingly, when the method is implemented using GBA, the GBA may be used to establish keys for secure transmission and/or delivery of SMS. SMS-based communications may be used for transmission and/or reception of any communication used within the GBA, noting that these communications may themselves be protected using the keys that will be derived in GBA.

In addition to the above, the server may further comprise a server authentication component. Also, the client may further comprise a client authentication component. The server authentication component may perform authentication of the server with the authentication component. The client authentication component may perform authentication of the client with the authentication component.

Further, the authentication component may be a Bootstrapping Server Function (BSF), the server authentication component may be a Network Application Function (NAF) and the client authentication component may be a GAA Server.

The method may further comprise communicating between the server and the client for determining security parameters to be used for the secure communication, wherein the communicating is performed by using a device management protocol (for example, the GBA). The secure communication may be for use in the device management protocol.

In a further embodiment, there is provided a method of enabling secure communication for use in a device and/or service/application management protocol, the secure communication being between a server and a client, the client being associated with a device, the secure communication requiring security parameters to be agreed between the client and server, the method comprising communicating between the server and client to agree the security parameters, wherein the communicating is performed by using the device management protocol. The device can be an M2M device.

In a further embodiment, there is provided an apparatus, system, module or network for enabling secure communication with a device, said communication being between a server and a client, the client being associated with the device. In addition, the apparatus, system, module or network may further include means for performing any one of the steps or features of the methods described above. The device can be an M2M device.

In a further embodiment, there is provided an apparatus, system, module or network for enabling secure communication for use in a device and/or service/application management protocol, the secure communication being between a server and a client, the client being associated with a device, the secure communication requiring security parameters to be agreed between the client and server, the method comprising communicating between the server and client to agree the security parameters, wherein the communicating is performed by using the device management protocol. In addition, the apparatus, system, module or network may further include means for performing any one of the steps or features of the methods described above. The device can be an M2M device.

In a further embodiment, there is provided a client including any means, features or functionalities corresponding to the means, features or functionalities relative to the client as recited by any one of the methods described above.

In a further embodiment, there is provided a server including any means, features or functionalities corresponding to the means, features or functionalities relative to the server as recited by any one of the methods described above.

In a further embodiment, there is provided a device comprising a card and a client, wherein the device is arranged for enablement of secure communication, the secure communication being between a server and the client, wherein the provision of the secure communication is based on a security association between a network and the card. The client may comprise any means, features or functionalities corresponding to the means, features or functionalities relative to the client as recited by any one of the methods described above. The device can be an M2M device.

In a further embodiment, there is provided a server arranged for enablement of secure communication with a device, the secure communication being between the server and a client associated with the device, wherein the provision of the secure communication is based on a security association between a network and a card, the card being associated with the device. The server may comprise any means, features or functionalities corresponding to the means, features or functionalities relative to the server as recited by any one of the methods described above. The device can be an M2M device.

In a further embodiment, there is provided a system for enabling secure communication with a device, said communication being between a server and a client, the client being associated with the device, wherein the provision of the secure communication is based on a security association between a network and a card, the card being associated with the device. The device can be an M2M device.

In a further embodiment, there is provided a method of enabling secure data communication with a device, the communication being between a server and a client associated with the device, wherein the security of the communication is enabled by a bootstrapped secret. The device can be an M2M device. The security protocol may be used to secure the data communication. The bootstrapped secret may be used to obtain the security elements used for the secure protocol. The bootstrapped secret may be a pre-shared secret, said secret being directly provided to the server and the client. The pre-shared secret may be permanently provided to the server and the client (e.g. by pre-provisioning the client and/or the server with said pre-shared secret, e.g. at manufacturing stage or before the client and/or server are used in a system). The pre-shared secret may be a strong, high entropy or a temporary, low-entropy pre-shared secret. The bootstrapped secret may be based on a public key or a certificate-based method. The bootstrapped secret may be provided via a bootstrap server. The security elements can be keys and/or similar arrangements well known in the art.

The communication may be an SMS-based communication. The security protocol is defined by ETSI TS 102.225. The method may use SMS binding. The device may be further associated with a card, and the security of the data communication may be controlled by means of the card. Any incoming SMS-based communication may be decrypted and/or checked by means of the card, and/or any outgoing SMS-based communication may be encrypted and/or checked by means of the card.

The communication may be a UDP-based communication. The security protocol may be a DTLS protocol.

The secure data communication may be provided over a communication interface. The communication interface may be used for managing the device of for managing the bootstrapping operations.

The data communication may be performed according to the LWM2M protocol.

In a further embodiment, there is provided an apparatus, system, module or network for enabling secure data communication with a device, the communication being between a server and a client associated with the device, wherein the security of the communication is enabled by a bootstrapped secret. The device can be an M2M device.

In a further embodiment, there is provided a method of retrieving security elements required for enabling secure data communication with a device, the communication being between a server and a client associated with the device, wherein the security elements are retrieved using a bootstrapping protocol. The device can be an M2M device. The bootstrapping protocol may retrieve the security elements in a secure session. The session may be secured based on a security protocol. The security protocol may be a DTLS protocol. The bootstrapping protocol may be based on GBA. The data communication may be an SMS-based communication. The bootstrapping protocol may be a LWM2M bootstrap protocol. The security elements can be keys and/or similar arrangements well known in the art.

In a further embodiment, there is provided an apparatus, system, module or network for enabling secure data communication with a device, the communication being between a server and a client associated with the device, wherein the security elements are retrieved using a bootstrapping protocol. The device can be an M2M device.

The secure communication may be for the purpose of managing the device and/or the client and/or services (e.g. provided by the device) by the server. Both the device and the server may be machines (i.e. not requiring any human intervention to work). When the device is a machine, the server may be used to manage it. Again, the management may be done without any human intervention (e.g. automatically).

As discussed above, the solution could be used in conjunction with the LWM2M protocol, but the solution could be extended to other Device Management protocols, or to other M2M services (e.g. securing delivery of binary SMS). In particular, and as discussed above, the use of the solution in conjunction with an M2M-specific protocol, such as LWM2M, allows the solution to be very efficient when used with M2M devices, and in particular, when used to manage the device and/or services provided by (or via) the device. In other words, all the advantages mentioned above are further enhanced and optimised when the solution is used in conjunction with an M2M-specific protocol.

In addition, there is also provided any aspects or combination of aspects according to any one of the claims.

Any combination of the features described in connection with any of the aspects is also provided, even if not explicitly disclosed.

Figure 2:
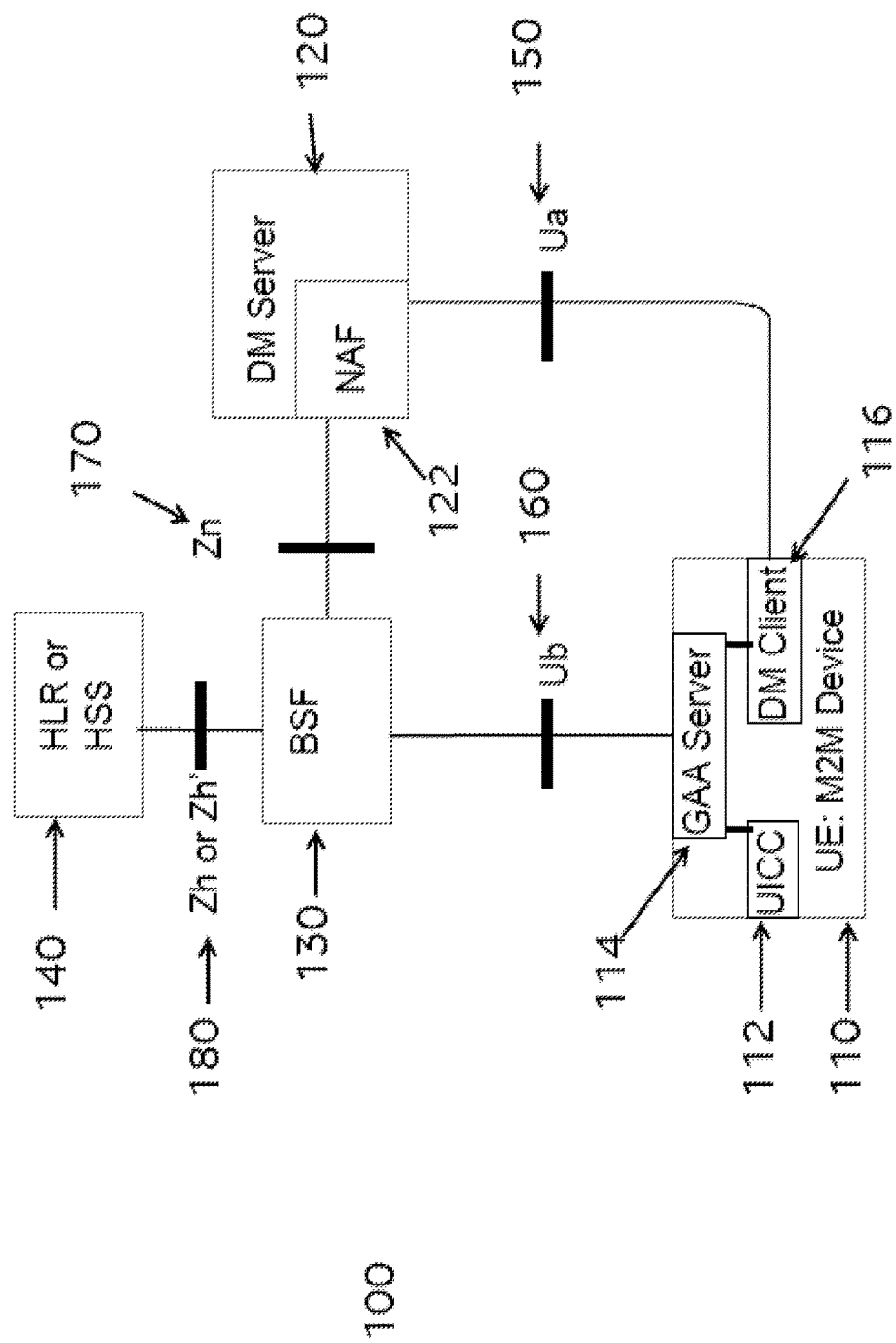
FIG. 2 shows a schematic diagram of an example of an architecture that can be used in accordance with the present invention, in particular when GBA is used.

With reference to FIG. 2, an exemplary architecture (100) is shown that may be implemented, in particular when GBA is used. A device 110 (in the example, an M2M Device and/or a User Equipment) is associated with a card 112 (in the example, a UICC) and a Client 116 (in the example, a Device Management (DM) client. Note that this client could also be an LWM2M Client, namely a client that can manage the device itself and service/applications provided by the device e.g. asset control). The device 110 is also associated with a device authentication component 114 (in the example, a GAA server). Further, a server 120 is provided (in the example, a DM server), the server associated with a server authentication component 122 (in the example, a Network Application Function (NAF)). Further, an authentication component 130 is provided (in the example, a Bootstrapping Server Function (BSF)) and a register 140 (in the example, an HLR or HSS). Also, four different interfaces are provided for communication between the various components, in particular interface Ua 150 between device 110 and server 120, interface Ub 160 between device 110 and authentication component 130, interface Zn 170 between authentication component 130 and server 120, and interface Zh/Zh' between authentication component 130 and register 140.

In particular, with reference to GBA, document TS 33.220 defines the following components and interfaces, which are shown on FIG. 2. NAF, the "Network Application Function", is a server-side component of an application that may be secured using GBA. In a preferred embodiment, the NAF may be a software component within a Device Management (DM) Server.

Some aspects of a BSF, HLR/HSS, UE, Ua, Ub, Zh/Zh' and Zn are provided in "Details of 3GPP standards and technologies used to implement aspects of the method and system" above.

On successful authentication of the device 110, the BSF 130 derives the shared secret Ks_NAF, which is retrieved by the NAF. In a preferred embodiment, the BSF 130 would most likely be on a separate server from the HLR/HSS 140, but within an M2M platform cluster.

The HLR/HSS may be "GBA-aware" (so that it stores details for a GBA user subscription) or may be a legacy component. In a preferred embodiment, the HLR/HSS would be the HLR or HSS of an M2M mobile operator (i.e. one dedicated specifically to serving M2M connections).

The UE 110 is, in the proposed solution, an M2M device.

In a preferred embodiment, the Ua is the interface between a Device Management client 116 and Device Management server 120.

In a preferred embodiment, the Ub would be the interface between the "GAA Server" component 114 of the device and the BSF 130.

In a preferred embodiment, the Zn interface is used.

In the proposed solution, this interface is between the Device Management Server 120 and the BSF 130. The WS version of the interface would allow placement of a DM Server in multiple locations (not just in the M2M operator/platform cluster), and allow future NAFs in multiple locations.

Figure 3:
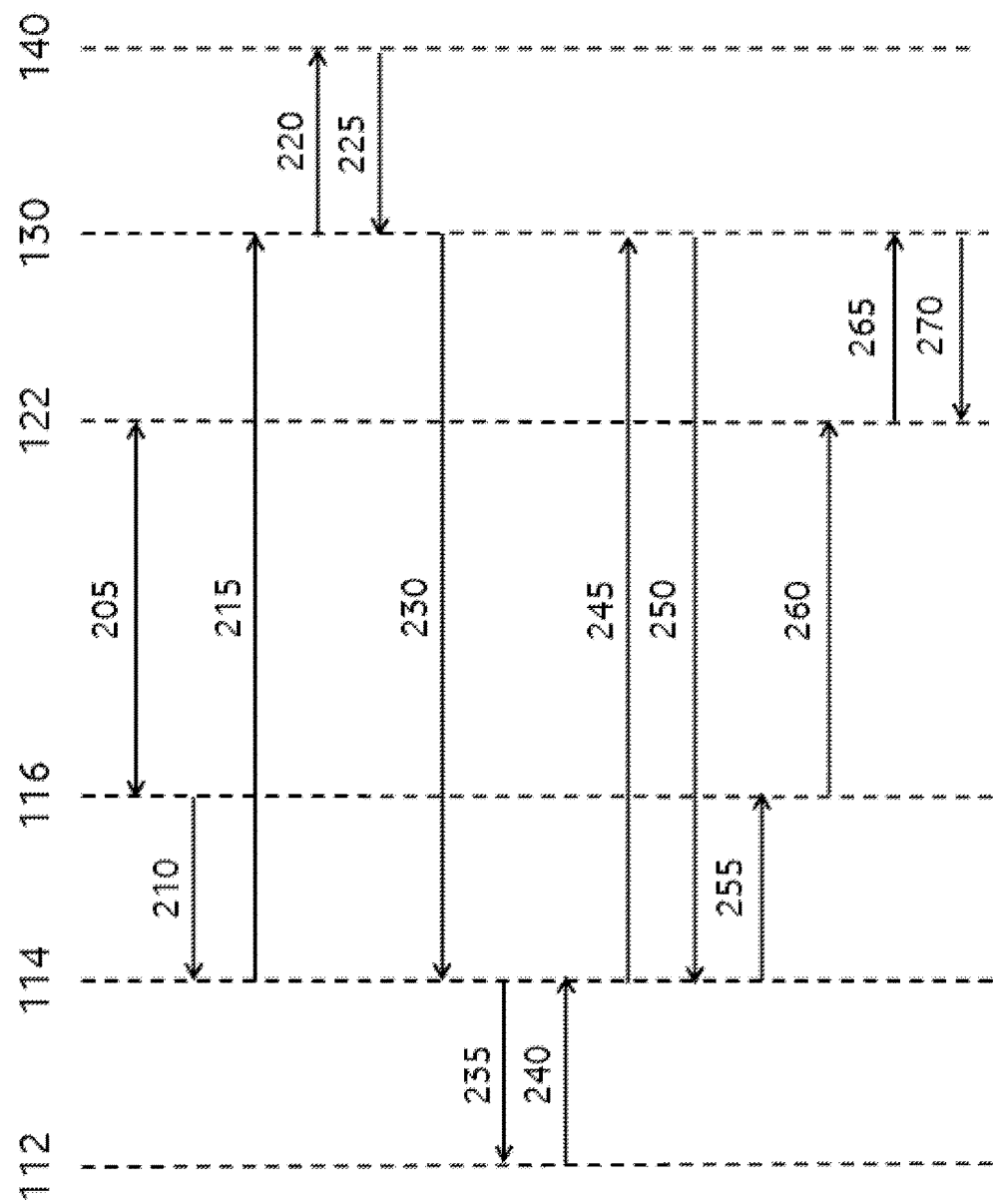
FIG. 3 shows an exemplary flow diagram of communications exchanged within the exemplary architecture of FIG. 2.

With reference to FIG. 3, the procedure for setting up the secure communication in accordance with the present invention is now described, in particular when GBA is used.

At 205, the UE 110 contacts over interface Ua the NAF 122 (in the described embodiment, the Device Management client 116 contacts the Device Management server 122) and discovers that the NAF requires it to acquire a shared secret using GBA. This could be because there is no existing secret, or the existing secret has expired, or is otherwise considered invalid by the NAF.

The exact interface and communication method may be specific to the application concerned. One possible interface and communication method for OMA Lightweight M2M is discussed below.

Over the internal UE interface from DM client to GAA server: at 210, the DM client 116 requests the GAA server 114 to obtain a shared secret. It presents an identifier for the corresponding NAF (NAF_Id).

Over the Ub Interface: at 215, The UE 110 contacts the BSF (GAA Server 114 contacts the BSF 130). This may be a basic http GET request. The UE presents an "IMPI" (equivalent of an IMSI) or a "TMPI" (equivalent of a TMSI) for anonymity reasons, if one is available.

Over the Zh or Zh' Interface: at 220, the BSF 130 requests an authentication vector from the HLR/HSS 140. At 225, the HLR/HSS 140 returns a fresh vector, consisting of a RAND, AUTN, XRES, CK, and IK, for example.

The BSF 130 generates a transaction identifier (B-TID) and passes (230) the B-TID together with the RAND and AUTN back to the UE 110. It may also indicate the lifetime of the B-TID, and the associated key.

Over the internal UE interface from the GAA Server to the UICC: at 235, the GAA Server 114 forwards the RAND and AUTN to the UICC 112 which validates the AUTN. If the AUTN is valid, then the BSF 130 is authenticated. At 240, the UICC 112 returns a RES, CK and IK to the GAA Server 114.

At 245, the UE 110 (GAA Server 114) contacts the BSF 130 again, using the resulting RES for HTTP Digest authentication (which is identified in "Details of 3GPP standards and technologies used to implement aspects of the method and system" above).

The BSF 130 verifies the HTTP Digest using the XRES. If it matches, then the UE 110 has been successfully authenticated. The BSF 130 stores the tuple <IMPI, B-TID, RAND, CK, IK> and tells at 250 the UE 110 that the authentication was successful. The UE 110 stores <B-TID, RAND, CK, IK>.

Over the internal UE 110 interface from DM client 116 to GAA server 114: the UE 110 (GAA Server 114) derives a secret Ks_NAF using the CK, IK, RAND, IMPI and NAF_Id. At 255, it passes Ks_NAF and the B-TID back to the DM client 116.

Over the Ua interface again: at 260, the UE 110 (DM Client 116) contacts the NAF (DM Server 122) and presents the B-TID as retrieved above.

Over the Zn Interface: at 265, the NAF 122 contacts the BSF 130, and presents the BTID. The BSF 130 authenticates the NAF, derives the corresponding Ks_NAF, and at 270 returns it to the NAF, together with an indicator of key lifetime.

The UE 110 (DM Client 116) and NAF (DM Server 122) now both share Ks_NAF. They can use it directly, or to derive their own session keys for further communication.

Again, the exact interface and communication method may be specific to the application concerned. One possible interface and communication method for OMA Lightweight M2M is discussed below.

As discussed above, the solution could be used in conjunction with the LWM2M standard. This standard can be viewed as a successor to existing OMA Device management standards (OMA DM 1.0 to 1.3), but heavily optimized for low end machine-type devices, and with an extended management scope beyond the device itself including the management of services provided by the M2M device such as asset control. This contrasts for instance with OMA DM 2.0 which is the successor for consumer devices like smartphones, tablets etc. Other widely-used Device Management standards include TR-069, which was developed by the Broadband Forum for managing Customer Premises Equipment (in particular DSL modems).

The exemplary flow described with reference to FIG. 3 is very generic, and can be used with many different sorts of device management protocols (or other application protocols). As can be seen, many details of the Ua interface are outside the scope of 3GPP and are left to other standards to complete (or left to proprietary implementations). However, integration with the LWM2M standard is possible, as described in these examples.

Under the specification (see above), the security for OMA LWM2M is based on DTLS v1.2 (see above) and CoAP (see above). Both the client and server must support pre-shared key DTLS (e.g. see section 7.1.1, page 41), whereas support for certificate-based authentication is only optional. This means that a key derived by GBA (Ks_NAF) could be used as a DTLS pre-shared key and it would work with any DM client/DM server pair.

The general approach for pre-shared key TLS is referenced in "Details of 3GPP standards and technologies used to implement aspects of the method and system" above. The GBA and TLS-PSK protocols work well together. In 205 described above, the "Server Hello" message contains a field where the server can indicate that it supports GBA-bootstrapping, and in response, the client can then provide an identifier (B-TID) for an already bootstrapped key (260). Or if the client doesn't already have a bootstrapped key, it asks the GAA server to get one, before resuming the "Client Hello" and "Server Hello" at 260. The use of the Ks_NAF to derive session keys is then specified entirely within the TLS-PSK protocol. The 3GPP spec assumes HTTP/TLS, but the basic approach looks the same for CoAP/DTLS.

To improve consistency with the OMA profile of GBA, the LWM2M spec may need to define a "protocol identifier" for DTLS pre-shared key and have it registered by OMNA (see section 5.2.1 of OMA GBA Profile, Approved Version 1.1—31 Jul. 2012 found at http://technical.openmobilealliance.org/Technical/release_program/sec_o-f_archive.aspx).

Aside from GBA aspects, the M2M device may be configured to support the security of OMA LWM2M, which is referenced in "Details of 3GPP standards and technologies used to implement aspects of the method and system" above.

Additional Aspects

1. Device Development for GBA

As can be seen from FIG. 2 and FIG. 3, the M2M device may contain several internal components. It should support a DM client which is "GBA aware", as well as a "GAA Server" component.

The GAA Server component should support internal interfaces to the DM client and to the SIM card (UICC) as well as the external Ub interface to the BSF. The interface to the UICC may be particularly challenging, as the M2M device may not expose an existing API to allow device software to send commands to the UICC. One possibility (that may be used) is for the modem to expose AT commands. However, this may not be at a sufficiently low level (AT+CSIM allows raw APDUs to be communicated to the UICC) in every case. Further, there may be security issues: while the GAA Server must be able to interface to the UICC, general applications installed on the device should not be able to use this interface, as that could allow external parties to impersonate the device (and engender fraud on the cellular network). So the API to the SIM Card should be privileged, as well as being sufficiently low level to be usable.

2. Ub Tunnelling, or GBA Push

The interface to the BSF is based on http and HTTP Digest authentication. One alternative may be "tunnelling" the Ub interface within the Ua interface, so that the device only needs to support the CoAP protocol (not HTTP as well).

A related alternative is using the GBA "Push" variant, and carrying push messages (Upa interface) within the Ua interface. Both of these would require identifying suitable commands and parameters in the Ua interface (i.e. the relevant Device Management protocol) to carry the tunnel or push messages. The interfaces and message flow for GBA push are outlined below (see also 3GPP TS 33.223, entitled "3G Security; Generic Authentication Architecture (GAA); Generic Bootstrapping Architecture (GBA) Push function", it can currently be retrieved by http://www.3gpp.org/ftp/Specs/html-info/33223.htm).

Figure 4:
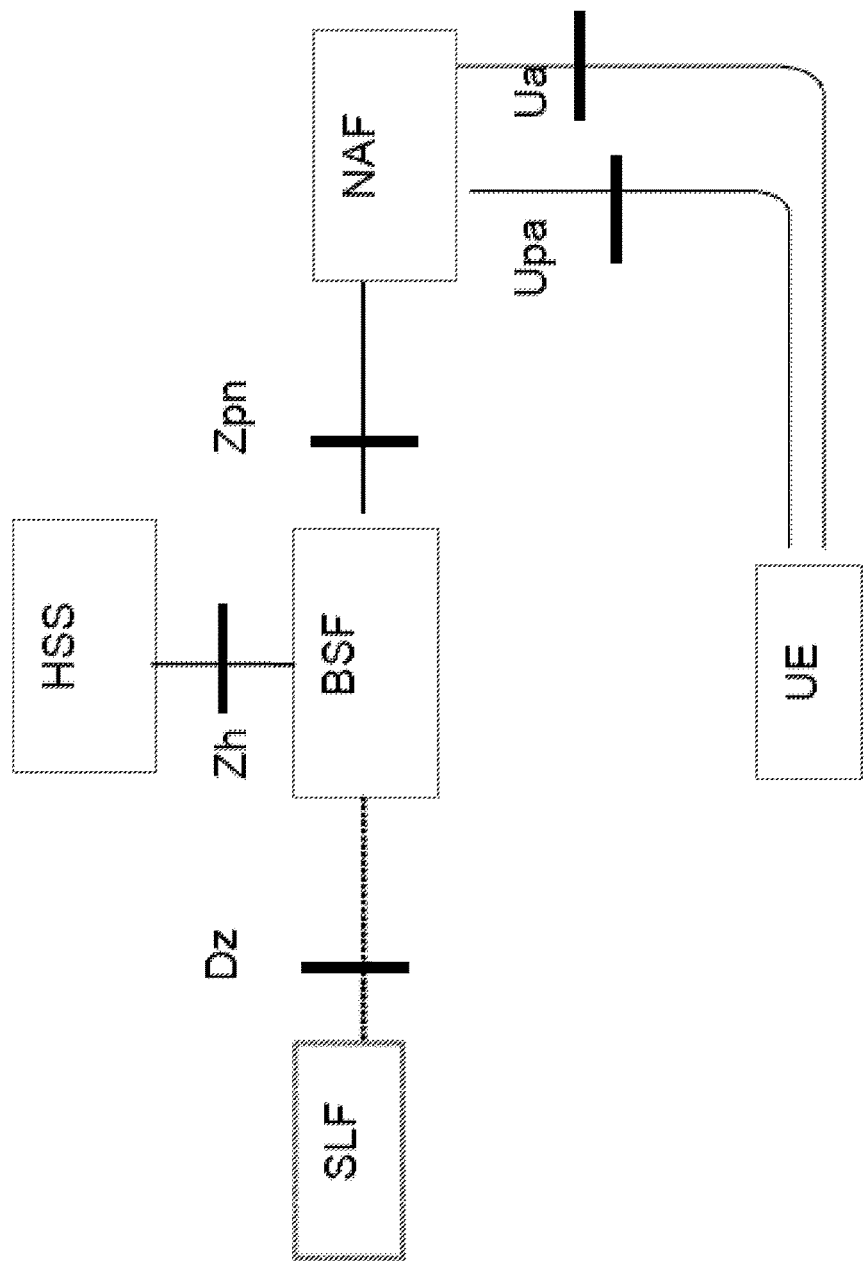
FIG. 4 shows a schematic diagram of an example of an alternative architecture that can be used in accordance with the present invention, in particular when generic bootstrapping architecture (GBA) is used.

With reference to FIG. 4, an example Processing and message flow for GBA Push follows:

1. A NAF establishes a shared NAF_SA with a UE which is registered for Push services. It knows the identity of the subscriber.
2. The Push-NAF generates the GPI (GBA Push info) Request and sends the GPI Request to the BSF.
3. Upon receiving the request from the NAF, the BSF checks that the NAF is authorized, and resolves the requested subscriber identifier to a private identifier (e.g. IMSI).
4. The BSF fetches a new AV (authentication vector) and subscriber's GUSS (GBA User Security Settings) from the HSS.
5. The HSS sends the AV and the GUSS to the BSF.
6. When the BSF receives the AV Response from the HSS, it generates the NAF keys based on the requested NAF_Id and creates the relevant GPI Response.
7. The BSF sends the GPI Response to the NAF.
8. The NAF stores the received information together with other user information in a NAF_SA.
9. The NAF then forwards the GPI to the UE over Upa using the selected transport mechanism and the given transport address.
10. When the UE receives the message containing the GPI, it processes the GPI as for regular GBA, and stores the corresponding NAF_SA(s)

The UE and NAF are now ready to use the established NAF_SA.

TR33.223 specifies that Upa is a new interface that is separate from Ua—"a new reference point Upa is introduced between the NAF and the UE" (Section 4.2.1). As such, the Ua interface should be unaware of whether GBA or GBA-push is being used.

3. Provisioning the Address of the BSF and the NAF

The address of the BSF (http URL) may be pre-loaded when the device is manufactured. It could be device managed itself, which would seem to create a "chicken-and-egg" problem, but the DM Server could, for instance, provide an address for an acceptable BSF in the ServerHello. Or http traffic might be routed by the M2M mobile operator to a default BSF address. Similarly, the location of the preferred DM Server might need to be pre-loaded, or the M2M mobile operator could route CoAP traffic to a default DM Server address.

4. Flavour of GBA (GBA-ME, GBA-U, GBA-SIM Etc.)

Several different versions of GBA are referenced in "Details of 3GPP standards and technologies used to implement aspects of the method and system". GBA-U has security advantages, but also logistic advantages: it permits a longer lifetime for the B-TID as the derived key is stored more securely. It allows safe retention of Ks during power-off cycles for instance. GBA-U requires specific support from the UICC, so would have a (modest) increment to the cost. Since M2M devices are typically provided with a new UICC anyway at manufacture, it is a software/development cost rather than a hardware cost. Also, in a model with a customised UICC, this may allow for a solution using restricted AT commands to the modem, rather than full AT+CSIM.

5. Location of the NAF (DM Server) and Type of Zn Interface

The architecture example allows for there to be several DM Servers in different locations: it could be part of an M2M platform (e.g. M2M mobile operator) cluster, or hosted elsewhere by a network operator/service provider, or perhaps by a customer of said operator/provider. The BSF may need to be located within a firewalled Demilitarized Zone (DMZ), or perhaps connected via an http proxy in the DMZ (so allowing external http Web Service access from NAFs), and then would execute the Diameter interface to the HLR/HSS. It may be undesirable to expose an http interface directly onto the server supporting the HLR, or to tunnel Diameter through firewalls. However, if the DM Server is itself part of the M2M platform cluster then this may be over-engineering. Possibly, a Diameter solution for the Zn interface then becomes acceptable.

6. Use of Zh or Zh' Interface

Ideally, the HLR may be upgraded to a full HSS with support for the Zh reference point. However, if the HLR/HSS only supports Zh' then the BSF will need to be more complicated, and take on some of the subscription management functions (profiling, lifetime, security policies) typically associated with the HSS.

7. Development of NAF Component

While the NAF functionality looks fairly straightforward, it will need to be developed for each DM Server used, and for each additional application which uses GBA.

GBA keys could be used to protect SMS (e.g. encrypt/integrity protect SMS using a secure packet interface e.g. like ETSI TS 102.225 which is used for SIM OTA). This SMS channel is likely to be more efficient than DTLS.

In addition, regardless of GBA, a secure SMS protocol could be linked to a Device and/or Service management protocol, namely: using a secure SMS protocol (e.g. originally designed for SIM OTA (102 225)), but now adapted for LWM2M communications, combined with using the LWM2M protocol to define (and manage) the necessary parameters for the secure SMS protocol (i.e. the relevant Klc, KID, SPI, TAR, and keys).

GBA could be used to securely derive the keys.

Further aspects and advantageous or preferable features are described in the following paragraphs.

LWM2M needs a security solution for the SMS bearer. Without a solution, SMS will not be usable as a bearer, severely limiting scope of LWM2M. A solution to this problem is to use SIM OTA security (e.g. see TS 102 225).

TS 102.225 relies on the keys and parameters being already agreed between client and server. However, it is difficult to pre-load these into LWM2M client devices, and ensure that they are sent to servers, because there is no present infrastructure for doing so. It would be pointless to deliver the keys and parameters over unsecured SMS.

There are various proposed solutions for delivering these keys and parameters in a secure way.

In a first solution, there is provided switching bearer to UDP/Coap and running DTLS. The DTLS session can be used to secure the LWM2M Bootstrap protocol. The LWM2M Bootstrap can be used to set the TS 102.225 keys and parameters securely. Note that managed resources/objects need to be defined to allow the Bootstrap server to update them; the format of these resources is specified in the numbered paragraphs below.

In a second solution, there is provided relying on a SIM card (UICC) which has already having been provisioned with keys and parameters, and using this card to terminate TS 102 225 security. Please note that, because this solution provides a secure channel, the same channel can be used to deliver other keys and parameters.

In a third solution, there is provided use of GBA to set up the keys and parameters. This works because the GPI (GBA Push Info) can be delivered over unsecured SMS. So, there is no requirement to have an initial key to protect the SMS. (Note that the delivery of the parameters like Kic, KID, SPI and TAR is not obvious, but these are only 6 bytes, and there are fields in the GPI e.g. App_Lbl, NAF_Id, P-TID which could be used to carry this info.)

Further details are provided in the numbered paragraphs below.

UDP channel security for [COAP] is referenced in "Details of 3GPP standards and technologies used to implement aspects of the method and system" above.

Since the LWM2M protocol utilizes DTLS for authentication, data integrity and confidentiality purposes, the LWM2M Client and LWM2M Server SHOULD keep a DTLS session in use for as long a period as can be safely achieved without risking compromise to the session keys and counters. If a session persists across sleep cycles, encrypted and integrity-protected storage SHOULD be used for the session keys and counters.

Note that the Client-Server relationship of DTLS (i.e. who initiated the handshake) is separate from the Client-Server relationship of LWM2M.

Considering that any device with a LWM2M Client can be managed by any LWM2M Server and LWM2M Bootstrap Server the choice of Cipher Suites is not limited to the list defined in Section 9 of [CoAP]. Due to the sensitive nature of Bootstrap Information, particular care has to be taken to ensure protection of that data including constraints and dependencies within a LWM2M Client/Bootstrap Server relationship according to the adopted security mode.

Concerning Bootstrap from a Smartcard, the same care has to be taken and a secure channel between the Smartcard and the LWM2M Device SHOULD be established as described in Appendix H of OMA LWM2M in reference to GlobalPlatform Secure Channel Protocol 03 (SCP 03) Amendment D v1.1 September 2009.

The keying material used to secure the exchange of information using a DTLS session may be obtained using one of the bootstrap modes referenced in "Details of 3GPP standards and technologies used to implement aspects of the method and system" above.

The Resources (i.e. "Security Mode", "Public Key or Identity", "Server Public Key or Identity" and "Secret Key") in the LWM2M Security Object that are associated with the keying material are used either
  1) for providing UDP channel security in "Device Registration", "Device Management & Service Enablement", and "Information Reporting" Interfaces if the LWM2M Security Object Instance relates to a LWM2M Server, or,
  2) for providing channel security in the Bootstrap Interface if the LWM2M Security Object instance relates to a LWM2M Bootstrap Server.

LWM2M Clients MUST either be directly provisioned for use with a target LWM2M Server (Manufacturer Pre-configuration bootstrap mode) or else be provisioned for secure bootstrapping with an LWM2M Bootstrap Server. Any LWM2M Client which supports Client or Server initiated bootstrap mode MUST support at least one of the following secure methods:
  1) Bootstrapping with a strong (high-entropy) pre-shared secret, as described in section 7.1 of OMA LWM2M. The cipher-suites defined in this section MUST NOT be used with only a low-entropy pre-shared secret.
  2) Bootstrapping with a temporary, low-entropy pre-shared secret (such as a PIN, password and private serial number) using the cipher-suite TLS_ECDHE_PSK_WITH_AES_128_CBC_SHA256, as defined in RFC5489.
  3) Bootstrapping with a public key or certificate-based method (as described in sections 7.1.2 and 7.1.3 of OMA LWM2M). The LWM2M client MUST use a unique key-pair, one which is unique to each LWM2M client.

For full interoperability, a LWM2M Bootstrap Server SHALL support all of these methods.

NOTE: The above security methods can also be used by the LWM2M Bootstrap Server to provision Klc and KID for SMS channel security (see below for SMS channel security).

SMS Channel Security

SMS Secured Packet Structure Mode

The Secured Packet Structure is based on [3GPP TS 31 115]/[ETSI TS 102 225]] which is defining secured packets for different transport mechanisms. The solution was originally designed for securing packet structures for UICC based applications, however, for LWM2M it is suitable for securing the SMS payload exchanged between client and server.

The SMS Secured Packet Structure mode specified in this section MUST be supported when the SMS binding is used.

A LWM2M Client which uses the SMS binding MUST either be directly provisioned for use with a target LWM2M Server (Manufacturer Pre-configuration bootstrap mode or Smart Card Provisioning) or else be able to bootstrap via the UDP binding.

The end-point for the SMS channel (delivery of mobile terminated SMS, and sending of mobile originated SMS) SHALL be either on the smartcard or on the device. When the LWM2M Client device doesn't support a smartcard, the end-point is on the LWM2M Client device.

A LWM2M Client, Server or Bootstrap Server supporting SMS binding SHALL discard SMS messages which are not correctly protected using the expected parameters stored in the "SMS Binding Key Parameters" Resource and the expected keys stored in the "SMS Binding Secret Keys" Resource, and SHALL NOT respond with an error message secured using the correct parameters and keys.

Device End-Point

If the SMS channel end-point is on the device the following settings SHALL be applied:

Class 1 SMS as specified in [3GPP TS 23.038]

TP-PID of 111101 (ME Data Download) as specified in [3GPP TS 23.040]

TP-OA: the TP-OA (originating address as defined in [3GPP 23.040] of an incoming command packet (e.g. CoAP request) MUST be re-used as the TP-DA of the outgoing packet (e.g. CoAP response)

Smartcard End-Point

If the SMS channel end-point is on the smart card the following settings SHALL be applied:

Class 2 SMS as specified in [3GPP TS 23.038]. The [3GPP TS 23.040] SMS header MUST be defined as below:

TP-PID: 111111 (USIM Data Download) as specified in [3GPP TS 23.040]

TP-OA: the TP-OA (originating address as defined in [3GPP 23.040] of an incoming command packet (e.g. CoAP request) MUST be re-used as the TP-DA of the outgoing packet (e.g. CoAP response)

SMS Secured Packet Mode Mechanisms

1. Secure SMS Transfer to UICC

A SMS Secured Packet encapsulating a CoAP request received by the LWM2M device, MUST be—according to [ETSI TS 102 225]/[3GPP TS 31.115]—addressed to the LWM2M UICC Application in the Smartcard where it will be decrypted, aggregated if needed, and checked for integrity.

If decryption and integrity verification succeed, the message contained in the SMS MUST be provided to the LWM2M Client.

If decryption or integrity verification failed, SMS MUST be discarded.

The mechanism for providing the decrypted CoAP Request to the LWM2M Client relies on basic GET_DATA commands of [GP SCP03]. This data MUST follow the format as below data_rcv_::=<address><coap_msg>
address::=TP_OA; originated address
coap_msg::=COAP_TAG
<coap_request_length><coap_request>
coap_request_length::=16BITS_VALUE
coap_request::=CoAP message payload NOTE: In current LWM2M release, the way the LWM2M Client Application is triggered for retrieving the available message from the Smartcard is at the discretion of the device: i.e. a middle class LWM2M Device implementing [ETSI TS 102 223] ToolKit with class "e" and "k" support could be automatically triggered by Toolkit mechanisms, whereas a simpler LWM2M device could rely on a polling mechanisms on Smartcard for fetching data when available.

2. Secured SMS Transfer to LWM2M Server

For sending a CoAP message to the LWM2M Server, the LWM2M Client prepares a data containing the right TP-DA to use, concatenated with the CoAP message and MUST provide that data to the LWM2M UICC Application in using the [GP SCP03] STORE-DATA command.

According to [ETSI TS 102 225]/[3GPP TS 31.115] the Smartcard will be in charge to prepare (encryption/concatenation) the CoAP message before sending it as a SMS Secure Packet ([ETSI TS 102 223] SEND_SMS command).

The SMS Secured Packet MUST be formatted as Secured Data specified in section 7.3.1.2.

The Secure Channel as specified in Annex H SHOULD be used to provide the prepared data to the Smartcard.

The SMS channel security is provided by the Secured Packet Structure [ETSI TS 102 225] and [SCP080] which is defining secured packets for different transport mechanisms.

The solution was originally designed for securing packet structures for UICC based applications, however, for LWM2M it is suitable for securing the SMS channel between client and server.

The SMS channel security specified in this section MUST be applied when the SMS binding is used.

When the LWM2M device supports a smartcard, the security SHOULD be terminated on the smartcard. The LWM2M client SHOULD pass SMS messages to the smartcard for encryption and integrity protection before sending, and SHOULD pass encrypted SMS messages received from the LWM2M server to the smartcard for decryption and integrity checking.

A LWM2M Client which supports the SMS binding SHALL support the Secured Packet Structure as defined in [ETSI TS 102 225] and [SCP080]. The LWM2M Client SHALL share the relevant keys—identified by Klc and KID—with a LWM2M Bootstrap Server during bootstrapping, or with a LWM2M Server otherwise.

A LWM2M Bootstrap Server which supports the SMS binding SHALL support the Secured Packet Structure as defined in [ETSI TS 102 225] and [SCP080].

A LWM2M Server which supports the SMS binding SHALL support Secured Packet Structure as defined in [ETSI TS 102 225] and [SCP080].

In SMS Secured Packet Structure mode, a CoAP message as defined in [CoAP] MUST be encapsulated in [3GPP 31.115] Secured Packets, in implementing—for SMS Point to Point (SMS_PP)—the general [ETSI 102 225] specification for UICC based applications.

The following applies to LWM2M Client and LWM2M Bootstrap Server and LWM2M Server:

The "Command Packet" command specified in [3GPP 31.115]/[ETSI TS 102 225] MUST be used for both CoAP Request and Response message.

The Structure of the Command Packet contained in the Short Message MUST follow [3GPP 31.115] specification.

Single DES SHALL NOT be relied on.

AES or Triple DES with three different keys MUST be used.

Preferably, AES should be used. Where AES is used it should be used with CBC mode for encryption (see coding of Klc in [ETSI TS 102 225] section 5.1.2) and in CMAC mode for integrity (see coding of KID in [ETSI TS 102 225] section 5.1.3).

SPI SHALL be set as follows (see coding of SPI in [ETSI TS 102 225] section 5.1.1).:
cryptographic checksum
ciphering
   The ciphering and crypto graphic checksum MUST use either AES or Triple DES
   Single DES SHALL NOT be used
   AES SHOULD be used
   When Triple DES is used, then it MUST be used in outer CBC mode and 3 different keys MUST be used
   When AES is used it MUST be used with CBC mode for ciphering (see coding of Klc in [ETSI TS 102 225] section 5.1.2) and in CMAC mode for integrity (see coding of KID in [ETSI TS 102 225] section 5.1.3
   process if and only if counter value is higher than the value in the RE Preferably, TAR (see coding of TAR in [ETSI TS 101 220], section 6) SHALL be set to a value in the range BF FF 00-BF FF FF.

NOTE: A TAR for LWM2M SMS security will be requested from ETSI SCP and the range above applies only until the TAR has been assigned.

Secured Data: contains the Secured Application Message which MUST be coded as a BER-TLV, the Tag (TBD: e.g. 0x05) will indicate the type (e.g. CoAP type) of that message.

There will be two different TARs for terminating the security on the smartcard or on the device.

The ciphering and integrity keys and associated counter values SHOULD be held in a smart card or other tamper-resistant secure storage environment (e.g. embedded secure element). The client SHOULD pass MT SMS to the smart card/SE for decryption and integrity checking, and SHOULD pass MO SMS to the smart card/SE for encryption and integrity protection before sending.

If the keys and associated counter values are not stored in the above recommended way, they SHALL be treated as session keys with a lifetime no greater than the duration of the Registration Lifetime. The LWM2M Client SHALL acquire fresh discard the key material on each "Register" or "Update" operation, load fresh key material using one of the mechanisms described below, and reset the counters.

Re-bootstrapping via the GBA Push mechanism, as described in [OMA DM v2.0] section 9.3.1.3. GBA Push uses a UICC to generate a so called Ks_(ext/int) _NAF shared secret both in the network and in the device. From this master key Ks_(ext/int)_NAF, two session secrets are then generated: the DMBEK and the DMBIK. The value of the Klc (ciphering key for SMS) SHALL be set by truncating DMBEK to the relevant key length (taking bits 0 to 127 for AES-128, or bits 0 to 167 bits for 3DES), and the value of the KID (integrity key for SMS) SHALL similarly be set by truncating DMBIK to the relevant key length (bits 0 to 127 for AES-128, or bits 0 to 167 for 3DES). The GBA Push Info SHALL be delivered to the LWM2M Client using a Class 1 SMS as specified in [3GPP TS 23.038] with a TP-PID of 111101 (ME Data Download) as specified in [3GPP TS 23.040].

Re-bootstrapping from the Smart Card by one of the following methods:
Using the above-described GBA Push mechanism, specifically with GBA-U, and with the Smart Card generating the DMBIK and DMBEK from Ks_int_NAF.
Using Remote File Management (RFM) or Remote Application Management (RAM) as specified in [ETSI TS 102.226]. The LWM2M Server SHALL generate random new key data of appropriate length for Klc and KID and ensure these are delivered to the Smart Card by a Class 2 SMS as specified in [3GPP TS 23.038] with a TP-PID of 111111 (USIM Data Download) as specified in [3GPP TS 23.040], protected using the relevant OTA security keys for RFM or RAM.

The Smart Card SHALL place the updated session keys in the provisioning file EF_LWM2M_Bootstrap.

Re-bootstrapping via the UDP binding, secured as described in Section 7.1 (UDP Security).

Where the UDP binding is unavailable, the LWM2M Server (or Bootstrapping Server) SHOULD send SMS to the LWM2M Client to refresh the session keys before the next attempted "Register" or "Update" operation. If the LWM2M Client attempts to contact the LWM2M Server using an expired registration, or attempts to "Register" or "Update" using a stale key, the LWM2M Server SHALL respond with an error (4.00 Bad Request) and SHALL send SMS to refresh the session keys. However, the LWM2M Server SHOULD send such SMS prior to the expiry of the current Registration, if the LWM2M Client is awake; or if the LWM2M Client is in a sleep cycle, the LWM2M Server (or Bootstrapping Server) SHOULD send such SMS on the next wake up. These measures will avoid a failed "Register" or "Update" operation.

As for Section 7.1 (UDP Security), where a session persists across sleep cycles, encrypted and integrity-protected storage SHOULD be used for the session keys and counters.

Alternatively, new session keys SHALL be established by one of the above mechanisms on wake up from a sleep cycle.

Preferably, Klc, KID, SPI and TAR SHALL be stored in the "SMS Binding Key Parameters" Resource.

Preferably, the corresponding key values should be stored in the "SMS Binding Secret Keys" Resource.

A LWM2M Client which uses the SMS binding may either be directly provisioned for use with a target LWM2M Server (Manufacturer Pre-configuration bootstrap mode) or else be able to bootstrap via the UDP binding.

A LWM2M Client, Server or Bootstrap Server supporting SMS binding SHALL discard SMS messages which are not correctly protected using the expected parameters stored in the "SMS Binding Key Parameters" Resource and the expected keys stored in the "SMS Binding Secret Keys" Resource, and SHALL NOT respond with an error message secured using the correct parameters and keys.

LWM2M Object: LWM2M Security

Description: This LWM2M object provides the keying material of a LWM2M Client appropriate to access a specified LWM2M Server. One Object Instance SHOULD address a LWM2M Bootstrap Server These LWM2M object resources MUST only be changed by a LWM2M Bootstrap Server or SmartCard provisioning and MUST NOT be accessible by any other LWM2M Server.

Example Object Info:

| Object | Object ID | Object URN | Multiple Instances? | Mandatory? |
|---|---|---|---|---|
| LWM2M Security | 0 | | Yes | Yes |

Resource Info:

| Resource Name | Type | Range or Enumeration | Units | Descriptions |
|---|---|---|---|---|
| LWM2M Server URI | String | 0-255 bytes | — | Uniquely identifies the LWM2M Server or LWM2M Bootstrap Server, and is in the form: "coaps://host:port", where host is an IP address or FQDN, and port is the UDP port of the Server. |
| Bootstrap Server | Boolean | | — | Determines if the current instance concerns a LWM2M Bootstrap Server (true) or a standard LWM2M Server (false) |
| Security Mode | Integer | 0-3 | — | Determines which UDP channel security mode is used<br>0: Pre-Shared Key mode<br>1: Raw Public Key mode<br>2: Certificate mode<br>3: NoSec mode |
| Public Key or Identity | Opaque | | — | Stores the LWM2M Client's Certificate (Certificate mode), public key (RPK mode) or PSK Identity (PSK mode). The format is defined in Section E.1.1. |
| Server Public Key or Identity | Opaque | | — | Stores the LWM2M Server's or LWM2M Bootstrap Server's Certificate (Certificate mode), public key (RPK mode) or PSK Identity (PSK mode). The format is defined in Section E.1.1. |
| Secret Key | Opaque | | — | Stores the secret key or private key of the security mode. The format of the keying material is defined by the security mode in Section E.1.1. This resource MUST only be changed by a bootstrap server and MUST NOT be readable by any server. |
| SMS Security Mode | Integer | 0-255 | — | Determines which SMS payload security mode is used (see section 7.2)<br>0: Reserved for future use<br>1: Secure Packet Structure mode device terminated<br>2: Secure Packet Structure mode smartcard terminated<br>3: NoSec mode<br>255: Proprietary modes |
| SMS Binding Key Parameters | Opaque | 6 bytes | — | Stores the KIc, KID, SPI and TAR. The format is defined in Section D.1.2. |
| SMS Binding Secret Keys | Opaque | 32-48 bytes | — | Stores the values of the keys for the SMS binding. This resource MUST only be changed by a bootstrap server and MUST NOT be readable by any server. |

| Resource Name | Type | Range or Enumeration | Units | Descriptions |
|---|---|---|---|---|
| LWM2M Server SMS Number | Integer | | | MSISDN used by the LWM2M Client to send messages to the LWM2M Server via the SMS binding. The LWM2M Client SHALL silently ignore any SMS not originated from unknown MSISDN |
| Short Server ID | Integer | 1-65535 | — | This identifier uniquely identifies each LWM2M Server configured for the LWM2M Client. This resource MUST be set when the Bootstrap Server resource has false value. Default Short Server ID (i.e. 0) MUST NOT be used for identifying the LWM2M Server. |
| Client Hold Off Time | Integer | | s | Relevant information for a Bootstrap Server only. The number of seconds to wait before initiating a Client Initiated Bootstrap once the LWM2M Client has determined it should initiate this bootstrap mode |

UDP Channel Security: Security Key Resource Format

This section defines the format of the Secret Key and Public Key and Identity resources of the LWM2M Server and LWM2M Bootstrap Objects when using UDP Channel security. These resources are used to configure the security mode and keying material that a Client uses with a particular Server. The Objects are configured on the Client using one of the Bootstrap mechanisms described in Section 5.1 of OMA LWM2M. The use of this keying material for each security mode is defined in Section 7.1 of OMA LWM2M.

Pre-Shared Key (PSK) Mode

The PSK is a binary shared secret key between the Client and Server of the appropriate length for the Cipher Suite used [RFC4279]. This key is composed of a sequence of binary bytes in the Secret Key resource. The default PSK Cipher Suites defined in this specification use a 128-bit AES key. Thus this key would be represented in 16 bytes in the Secret Key Resource.

The corresponding PSK Identity for this PSK is stored in the Public Key or Identity resource. The PSK Identity is simply stored as a UTF-8 String as per [RFC4279]. Clients and Servers MUST support a PSK Identity of at least 128 bytes in length as required by [RFC4279].

Raw-Public Key (RPK) Mode

The raw-public key mode requires a public key and a private key of the appropriate type and length for the Cipher Suite used. These keys are carried as a sequence of binary bytes with the public key stored in the Public Key or Identity Resource, and the private key stored in the Secret Key Resource. The default RPK Cipher Suites defines in this specification use a 256-bit ECC key. Thus the Certificate Resource would contain a 32 byte public key and the Secret Key Resource a 32 byte private key.

Certificate Mode

The Certificate mode requires an X.509v3 Certificate along with a matching private key. The private key is stored in the Secret Key Resource as in RPK mode. The Certificate is simply represented as binary X.509v3 in the value of the Public Key or Identity Resource.

SMS Payload Security: Security Key Resource Format

This section defines the format of the Secret Key and Public Key and Identity resources of the LWM2M Server and LWM2M_Bootstrap Objects when using SMS Payload security. These resources are used to configure keying material that a Client uses with a particular Server. The Objects are configured on the Client using one of the Bootstrap mechanisms described in Section 5.1. The use of this keying material is defined in Section 7.2.

The SMS key parameters are stored in the order Klc, KID, SPI, TAR (Klc is byte 0).

Ordering of bits within bytes SHALL follow ETSI TS 102 221 "Coding Conventions" (b8 MSB, b1 LSB).

Unbootstrapping

If a Security Object Instance is to be deleted, some related resources and configurations need to be deleted or modified. Therefore when Delete operation is sent via Bootstrap Interface, the Client MUST proceed following procedure.

1. If there is an Object Instance that can be accessed only by a Server of the Server Object Instance (i.e. the Server is Access Control Owner and the LWM2M Server can access the Object Instance only in an Access Control Object Instance), the Object Instance and the corresponding the Access Control Object Instance MUST be deleted
2. If an Object Instance can be accessed by multiple Servers including the Server which Security Object Instance is to be deleted, then:

An ACL Resource Instance for the Server in Access Control Object Instance for the Object Instance MUST be deleted If the Server is Access Control Owner of the Access Control Object Instance, then the Access Control Owner MUST be changed to another Server according to the rules below: The Client MUST choose the Server who has highest sum of each number assigned to an access right (Write: 1, Delete: 1) for the Access Control Owner. If two or more Servers have the same sum, the Client MUST choose one of them as the Access Control Owner.

3. Observation from the Server MUST be deleted
4. The Server Object Instance MUST be deleted
5. Client MAY send "De-register" operation to the Server Note: To monitor the change of Access Control Owner, the Server MAY observe Access Control Owner Resource.

After the shared secret has been established between the NAF 122 and the UE 110, secure communication via interface Ua 150, or via any other suitable interface between the NAF 122 and the UE 110, between the two entities may be established. As explained earlier, this may be achieved using LWM2M, wherein a key derived by GBA (Ks_NAF) can be used as a DTLS pre-shared key and will work with any DM client/DM server pair.

Figure 5:
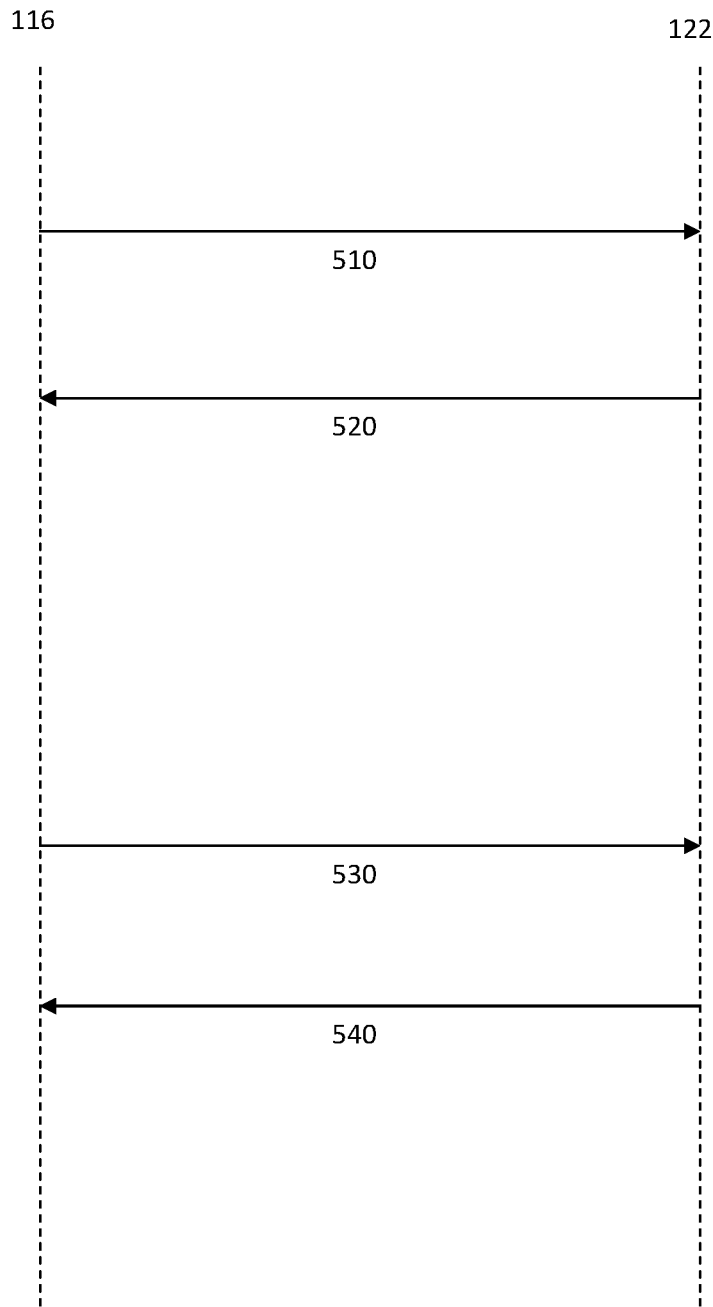
FIG. 5 shows an example administration process for an interface between the UE and the NAF of FIGS. 1, 2 and 4.

FIG. 5 shows an example administration process for an interface between the UE 110 and the NAF 122, the administration process being for client registration as part of LWM2M (for more details, see section 5.2 of the Lightweight Machine to Machine Technical Specification Candidate Version 1.0—10 Dec. 2013 OMA-TS-LightweightM2M-V1_0-20131210-C). In step 510, the DM client 116 registers with the NAF 122. This is performed using the "Register" operation.

The Register operation may comprise a number of parameters, at least some of which may be set by the DM client 116. Further details of available parameters for the Register operation may be found in section 5.2.1 of OMA-TS-LightweightM2M-V1_0-20131210-C. One of the parameters available is the "Endpoint Client Name" (further details of which may be found in section 6.2 of OMA-TS-LightweightM2M-V1_0-20131210-C). Other parameters may include, for example, "Binding Mode" and/or "SMS Number" etc, although these shall not be discussed any further herein.

The Endpoint Client Name is a name for the DM client 116 (or more generally for the UE 110) and it identifies the DM client 116 (or more generally the UE 110) to the NAF 122 (and optionally also the BSF 130). The Endpoint Client Name may be set by the DM client 116 and provided to the NAF 122 during registration (and optionally provided to the BSF 130 during the bootstrap procedure, or at any other time). The NAF 122 (and optionally the BSF 130) may then use the Endpoint Client Name to identify the DM client 116 (or more generally the UE 110) in any subsequent processes and/or communications.

The name chosen for the Endpoint Client Name may have privacy implications, in particular if the UE 110 is linked to a human in some way (for example, if the UE 110 is a medical device or a metering device in a house etc). Therefore, it may be preferable to set the Endpoint Client Name to a name that is unlikely to compromise the privacy of the UE 110 or any people or entities associated with the UE 110.

In consideration of this, the DM client 116 (or more generally the UE 110) may set the Endpoint Client Name to be equal to, or be a value derived from, or otherwise linked to, at least part of a temporary GBA identifier, or indeed any data (or any part of data) that is shared between the UE 110 and the BSF 130 (for example, as part of the bootstrapping process).

For example, it may be set to equal at least part of the TMPI (Temporary Mobile Private Identity), or to the identifier of the shared secret (for example, the B-TID, or the P-TID where the GBA-push variant is used). Alternatively, the Endpoint Client Name could be set to be equal to at least part of two or more items of data that are shared between the UE 110 and the BSF 130.

Whilst the above sets out some specific examples of data items that the Endpoint Client Name may be set to equal, it will be appreciated that any other data items shared between, or known to both of, the UE 110 and the BSF 130 may be used. For example, in step 215 of the GBA process described above and shown in FIG. 3, the UE 110 contacts the BSF 130, which may be a basic GET request. As explained in detail in TS 24.109—Section 4.3 and Annex A.3, in particular Table A.3-1, this message could contain one or more of a "Request URI" (by default, but could contain other data), a "Host" (BSF domain name and port), a "User Agent field, a "Date" field and an "Authorization" field (which in turn contains a "private user identity", a "realm" (equal to the host), a "nonce", a "uri" (equal to the Request URI) and a "response" field). The "private user identity" (which is likely to be either the IMPI or TMPI, although could be any other identifier) may be the most useful of these fields for setting the Endpoint Client Name, but it will be appreciated that at least part of any one or more of these items could be used for setting the Endpoint Client Name.

Furthermore, a "401 Unauthorized" response message (defined in Table A.3-3 of TS 24.109) contains a "Server" field, another "Date" field, and a "WWW-Authenticate" field (which in turn contains the "realm", a "nonce", an "algorithm" (specified to be AKAv1-MD5), a "qop" field (specified to be "auth-int") and an "opaque" field (which contains random data. Again, it will be appreciated that at least part of any one or more of these items could be used for setting the Endpoint Client Name, however the "nonce" field (which is constructed to contain the "RAND" and "AUTN" parameters, and other "server specific data") may be the most useful of these fields for setting the Endpoint Client Name. The GAA server 114 may pass the RAND and AUTN to the UICC 112 and receive in return the RES and CK|IK (which is equal to the Ks). Since the BSF 130 also knows the RES and Ks, these are also data shared between the UE 110 and BSF 130, so at least a part of at least one of the RES and Ks could also be used in setting the Endpoint Client name.

Furthermore, the next "GET" message (defined in Table A.3-4 of TS 24.109) contains the same parameters as the first GET message with some additional items: the "nonce", "opaque" and "algorithm", which are copied from the "401 unauthorized" message above, and also a random client nonce "cnonce", nonce count "nc" and the "response", which is computed using HTTP Digest Authentication (RFC2617) treating the "RES" as the password. Again, it will be appreciated that at least part of any one or more of these items could be used for setting the Endpoint Client Name.

Furthermore, the final "OK" message (defined in Table A.3-5 of TS 24.109) contains an "Authentication-Info" field with sub-fields "cnonce", "nc", "opaque", "nonce" and "qop", copied from the "GET" message above, and a further field "rspath" constructed using HTTP Digest authentication from the server. There is also a further date field "Expires" and an xml document in the message body containing the "B-TID" and "Lifetime". Again, it will be appreciated that at least part of any one or more of these items could be used for setting the Endpoint Client Name.

Other data that may be shared between the UE 110 and BSF 130 may include: any additional fields and messages exchanged during Ub 160 communications error cases; any extensions to the Ub 160 messages with additional non-standard fields or headers (to communicate yet more shared data); any parameters passed from the BSF 130 to the UE 110 over the Upa interface (e.g. anything within a GBA Push Information message) and any parameters that might be exchanged as a result of tunnelling the Ub or Upa interfaces.

In summary, the Endpoint Client Name, may be set to be at least part of any one or more items of data that are shared between (i.e., known to both) the UE 110 and the BSF 130, a number of which items or data are identified above.

A number of these items of data have a random component that is used to disguise the underlying private identifier. For example, the TMPI anonymises the TMSI, and the B-TID/P-TID is randomly generated by the BSF 130 to disguise the Ks or Ks_NAF, which is kept private by the UE 110 and the BSF 130. Therefore, by setting the Endpoint Client Name to equal at least part of any one or more of these temporary identifiers, or indeed any other item of data that is shared between the UE 110 and the BSF 130 (and therefore linked in some way to underlying private identifiers), privacy of the DM client 116 and UE 110 may be maintained.

In an alternative, the Endpoint Client Name may be set to a value derived at least in part from at least part of at least one of the data items shared between the UE 110 and the BSF 130. For example, it may be a hash, or any other form of modification, of at least part of one or more of the data items shared between the UE 110 and the BSF 130, or a concatenation of at least part of two or more of the data items shared between the UE 110 and the BSF 130, etc.

In a further alternative, the BSF 130 may set the Endpoint Client Name and provide it to the UE 110. The BSF 130 may allocate an Endpoint Client Name during the bootstrapping process and provide it to the UE 110 as part of the bootstrapping process described earlier, or it may set the Endpoint Client Name and provide it to the UE 110 at any other time. For example, before performing the Register operation in step 510, the UE 110 may transmit a request to the BSF 130 for an Endpoint Client Name, in response to which the BSF 130 may return the Endpoint Client Name that it has allocated to the DM client 116/UE 110.

The BSF 130 may generate the Endpoint Client Name using at least part of any one or more data items that are shared between the UE 110 and the BSF 130, for example at least part of any one or more of the data items identified above. As explained above in respect of the UE 110, the BSF 130 may set the Endpoint Client Name to equal at least part of any one or more of the shared data items, or to a value derived at least in part from at least part of any one or more of the shared data items. It may additionally or alternatively link the Endpoint Client Name to at least part of any one or more data items that are shared between the UE 110 and the BSF 130, for example using a database linkage at the BSF 130 or a database accessible to the BSF 130. In an alternative, the link between the Endpoint Client name and the at least part of any one or more of the shared data items may be kept via a database linkage at any other entity, for example at the NAF 122, or at a database accessible to the NAF 122.

Thus, the Endpoint Client Name can be equal to, or a derivation from, or otherwise linked to, at least part of any one or more field/parameter/data items that are shared between the UE 110 and the BSF 130.

The BSF 130 may keep a record of the Endpoint Client Name and link it with other information it has for the DM client 116/UE 110. The linkage may be to information that the NAF 122 is able to pass at a later time to the BSF 130 using the Zn 170 or Zpn interface in order to verify an Endpoint Client Name that it has received as a parameter of a Register operation (details of this are described later).

Details of the information that the NAF 122 is able to pass to the BSF 130 using the Zn 170 or Zpn interface are described in TS29.109, Section 5.2-5.4.

For the Zn 170 interface, the information includes "Session ID", "Address" and "Realm" of both the NAF 122 and the BSF 130 (only for Diameter 5.2), the "Transaction Identifier" (B-TID), the "NAF-ID" and a "GBA_U-Awareness-Indicator". There are also some optional "GAA-Service-Identifier", "AVP", "Proxy Info" and "Route Record" fields (Diameter, 5.2) or an optional "extension" field (for Web Services 5.3).

For the Zpn interface, the information includes the same information identified for Zn above (except that B-TID is replaced by P-TID) and some additional parameters "UE-Id", "UE-Id-Type", "UICC-App-Label", a "UICC-ME" flag, a "Requested-Key-Lifetime", a "Private-Identity-Request" and a "Security-Feature-Request". The UE-Id may be something like the MSISDN, or the IMSI, or an IMS name like an IMPI or IMPU.

Most of these parameters may be unrelated to the client: they are either fixed between the NAF 122 and BSF 130, or are otherwise independent of the client. Exceptions to this are the B-TID, P-TID, and UE-Id, which are related to the client. Therefore, the Endpoint Client Name may be linked at the BSF 130 to the identifier of the shared secret (the B-TID or P-TID) and/or the UE-Id (for the "GBA push" variant) so that the NAF 122 may later use the identifier of the shared secret to verify an Endpoint Client Name that it receives (details of this are described later).

In a further alternative, where the UE 110 generates the Endpoint Client Name, it may pass the Endpoint Client Name to the BSF 130 for the BSF 130 to keep a record of the Endpoint Client Name with a linkage to other information it has for the DM client 116/UE 110, for example the B-TID/P-TID and/or UE-Id, as explained above.

In a further alternative, the UE 110 and the BSF 130 may both generate the Endpoint Client Name based on the same information that is shared between them. In this way, the BSF 130 may keep a record of the Endpoint Client Name with a linkage to other information it has for the DM client 116/UE 110, for example the B-TID/P-TID and/or UE-Id, as explained above, and the UE 110 may use the Endpoint Client Name in the "Register" operation, without the Endpoint Client name having to be passed between the BSF 130 and UE 110.

In addition, or as an alternative, to setting the Endpoint Client Name in this way, the DM client 116 (or more generally the UE 110) may set the value of another parameter of the Register operation—the "Lifetime". The Lifetime parameter sets a time period for which the registration of the DM client 116 (or more generally the UE 110) should remain valid. As explained in section 5.2.1 of OMA-TS-LightweightM2M-V1_0-20131210-C, the NAF 122 should remove the registration if a new registration or an update is not received within the Lifetime. Therefore, Lifetime sets a time limit for the lifetime of the registered secure interface between the UE 110 and the NAF 122, i.e., the session lifetime of the secure interface between the UE 110 and the NAF 122.

The DM client 116 may set the Lifetime based on a lifetime of the shared secret (Ks_NAF)/a lifetime of the identifier of the shared secret (B-TID or P-TID). A lifetime of an identifier of the shared secret may be considered also to be the lifetime of the shared secret that it identifies, since after the identifier has expired, the secret to which the identifier points effectively also expires. As explained earlier, as part of the bootstrapping process, the BSF 130 may set a lifetime for the identifier of the key (for example, the B-TID Lifetime, or the Key_LT, which is the GBA-push equivalent of the B-TID Lifetime). This may be communicated to the UE 110 as part of the bootstrapping process. Alternatively, it may be communicated to the UE 110 at any other time, for example the UE 110 may transmit the identifier of the shared secret to the BSF 130 and request that the associated lifetime of the identifier of the shared secret be returned.

The Lifetime parameter may be set based on, or in consideration of, the lifetime of the shared secret. In the following description, "lifetime of the shared secret" could be the time remaining on the lifetime of the shared secret (for example, if it is initially set to 72 hours, 30 hours later the remaining lifetime of the shared secret will be 42 hours), or, alternatively, it could be the value to which the lifetime of the shared secret is initially set.

The Lifetime parameter may be set to be equal to the lifetime of the shared secret, or it may be set to be larger or smaller than the lifetime of the shared secret. For example, it may be set to a value that is greater than the lifetime of the shared secret by a particular period of time (for example, greater by 5 hours, or 20 hours, or two days, or one week, or any other suitable amount, such as a value between one second and six months), or to be larger than the lifetime of the shared secret by a particular multiplier (for example, to be two times, or two and a half times, or four times, or any other suitable amount, such as a value between 0.01 and 50, greater). Alternatively, it may be set to a value that is less than the lifetime of the shared secret by a particular period of time, or to be smaller than the lifetime of the shared secret by a particular division (for example, half the size, a fifth of the size, etc). It will be clear from these specific examples that the Lifetime parameter may be based on, or derived from, or set in consideration of, the lifetime of the shared secret in any way.

Preferably, the Lifetime parameter is set to be greater than or equal to the lifetime of the shared secret. After a secure interface has been registered, the DM client 116 may check the remaining lifetime of the identifier of the shared secret and use this check to determine if a new bootstrap run should be carried out to obtain a new shared secret and identifier of the shared secret. If the remaining lifetime of the shared secret has expired, or is close to expiry (for example, the remaining lifetime is less than a threshold amount, which might be 6 hours, or 12 hours, or 24 hours, or two days, or any suitable period of time, such as a period of time between one second and six months), the DM client 116 may initiate a new bootstrap run. By setting the Lifetime parameter to be greater than or equal to the lifetime of the shared secret, the UE 110 may be prevented from regularly attempting to acquire a new shared secret and identifier, when the registration lifetime is significantly longer (for example, the UE 110 may be prevent from undertaking a new bootstrapping run every few hours when the registration lifetime is weeks or months). For example, the lifetime of the identifier of the shared secret may be three days. The Lifetime parameter (i.e. the session lifetime of the secure interface) may thus be set to three days and the threshold amount may be 12 hours. Two days and 14 hours later, when the DM client 116 checks the remaining lifetime of the identifier of the shared secret, it will determine that it has only 10 hours remaining, which is less than the threshold amount. At this time, it may initiate a new bootstrap run to obtain a new shared secret and/or identifier of a new shared secret, which can thus take place only when the existing shared secret is close to expiry and before the session lifetime of the secure interface expires.

Consequently, by setting the Lifetime parameter based on the lifetime of the shared secret, the UE 110 and BSF 130 overhead may be reduced as unnecessary new bootstrapping runs may be reduced or eliminated. Furthermore, the UE 110 and NAF 122 overhead may also be reduced because every time a new bootstrapping run is executed, a new Register or Update operation may be initiated by the DM client 116 (as explained in more detail below).

Furthermore, the DM client 116 may check the remaining lifetime of the shared secret before it attempts to connect with the NAF 122 over the registered, secure interface (for example, before it connects to transmit a request for a service, or to pass requested data to the NAF 112 etc). For example, if the remaining lifetime of the identifier is non-zero, or exceeds a threshold amount (for example, 6 hours, or 12 hours, or 24 hours, or two days, or any other suitable amount, such as an amount between one second and six months) the DM client 116 may simply connect with the NAF 116 using the existing, registered, secure interface. If the lifetime of the shared secret is invalid, or is less than the threshold amount, the registration may have expired or be close to expiry, so the DM client 116 can pre-emptively run a new bootstrapping process to obtain a new shared secret and identifier of the new shared secret and either update the previous registration, or carry out a new registration. By doing this, it may be possible for the UE 110 to identify that a new bootstrapping run is required before it attempts to connect with the NAF 122 and receive an error message because the registration has expired. This may even further improve efficiency because the UE 110 can proactively obtain a new shared secret and identifier when the registration has expired or is close to expiry, rather than waiting to receive an error message from the NAF 122.

In a further advantage, by setting the Lifetime parameter in this way, it is possible for the BSF 130 to exercise some control over Session Lifetimes. This is because the BSF 130 may set the lifetime of the identifier of the shared secret, which in turn will affect the Lifetime parameter set by the UE 110 for the Register operation. The BSF 130 may effectively therefore influence the value of the Lifetime parameter based on its knowledge of how long particular devices can be expected to keep secrets, how secure particular devices are, what type of UICC 112 the device contains, what threats the device faces etc. Furthermore, it also affords the BSF 130 the opportunity to vary the lifetime of the identifier of the shared secret and the Lifetime parameter dynamically to exercise load balancing, for example to space out re-bootstrapping requests, update requests etc.

More preferably, the Lifetime parameter is set by the UE 110 to be greater than the lifetime of the shared secret, for example by a particular amount (such as Lifetime=shared secret lifetime+12 hours, or Lifetime=shared secret lifetime+2 days, or greater by any other suitable amount, for example by an amount between 1 minute and 6 months), or by a particular multiple (such as Lifetime=2×shared secret lifetime, or Lifetime=3.5×shared secret lifetime, or by any other suitable multiple, for example by a multiple between 1.01 to 20). For example, the shared secret lifetime may be one day, but the NAF 122 may accept a Lifetime parameter of three days. The UE 110 may then attempt to run a new bootstrapping process after the lifetime of the identifier expires and, if the re-run fails, try again after a period of time (for example, it may re-try at 2 hourly intervals, or 6 hourly intervals, or one day intervals, or any other suitable period of time). Because the registration Lifetime (i.e. the session lifetime of the secure interface between the UE 110 and the NAF 122) is greater than the lifetime of the shared secret, even if the UE 110 fails to obtain a new shared secret and identifier (for example, because the BSF 130 was unreachable at renewal time, etc), it may still continue to use the registered interface and have one or more further opportunities to re-run the bootstrapping process before the registration expires. Thus, a balance may be achieved between minimising the number of new bootstrapping runs and new registrations or registration updates that are undertaken (thereby reducing overheads) and avoiding expiration of the secure interface between the UE 110 and NAF 122.

It will be appreciated that the same effect may be achieved when Lifetime is set to equal the lifetime of the shared secret, or where Lifetime is set to a value less than the lifetime of the shared secret, by configuring the UE 110 to attempt a new boot-strapping run when the remaining lifetime of the identifier of the shared secret is less than a threshold amount, wherein the threshold amount is such that a new bootstrapping run will be attempted at the time that Lifetime expires, or before Lifetime expires.

An alternative where the Lifetime parameter is set to be less than the lifetime of the shared secret, may be preferable where the security information comprises a key or keys (for example, the Ks_NAF) that are themselves used over the secure interface. In this case, it may be preferable for the lifetime of the secure registration to be less than the lifetime of the keys used to secure the interface, so that expired keys are not used on the interface This is in contrast to, for example, DTLS, where the security information is used to negotiate new keys.

The Register operation might also comprise the identifier of the shared secret (for example, the B-TID or P-TID), which is referred to as the PSK Identity in LWM2M, and optionally also an identifier of the security mode to be used, for example Pre-Shared Key mode (or alternatively a raw public key mode, or a certificate mode etc). The Register operation might optionally comprise any other suitable registration data that might be used by the NAF 122 to register the secure interface.

Upon receiving the "Register" operation in step 510, the NAF 122 may check the parameters of the operation before transmitting a "Created" response to the DM client 116 in step 520 to confirm that the registration has been successful. For example, if the BSF 130 has stored the Endpoint Client Name with a linkage to other information it has for the DM client 116/UE 110 (for example the B-TID/P-TID and/or the UE-Id), the NAF 122 may verify the Endpoint Client Name by making use of the information it has for the DM client 116/UE 110. For example, the NAF 122 may pass to the BSF 130 the identifier of the shared secret (B-TID/P-TID) that is a parameter of the Register operation and request the Endpoint Client Name that the BSF 130 has linked with the identifier of the shared secret. If the Endpoint Client Name that the BSF 130 returns matches the Endpoint Client name that was included as a parameter in the Register operation, the Endpoint Client Name received as part of the Register operation may be verified by the NAF 122 and the NAF 122 may continue with the registration process as normal. If they do not match, the NAF 122 may return an error message to the DM client 116 in step 520 to indicate that registration has failed.

In an alternative, the NAF 122 may pass to the BSF 130 both the identifier of the shared secret and/or UE-Id and the Endpoint Client Name that it has received and request that the Endpoint Client Name is verified against the BSF's records. The BSF 130 may then return confirmation of a positive verification or an indication that the verification has failed. The NAF 122 may then proceed with the registration process as normal or transmit an error message to the DM client 116 in step 520 as described above.

In a further alternative, the NAF 122 may carry out this verification process by referring to records that are stored on the NAF 122 or in a location accessible to the NAF 122, for example on a database that is accessible to the NAF 122. For example, in the GBA-push implementation, the BSF 130 may include the Endpoint Client Name in the GPI response that it transmits to the NAF 122. The NAF 122 may then link the Endpoint Client Name with the other information it has for the DM Client 116/UE 110 by storing an association between them in the NAF_SA. The NAF 122 may then check the Endpoint Client Name that it receives as a parameter of the Register operation against the Endpoint Client Name that it has stored in association with the other information for the DM Client 116/UE 110 that it receives. Alternatively, the NAF 122 may have obtained the Endpoint Client Name from the BSF 130 at some other time and kept a record linking the Endpoint Client Name to the other information for the DM Client 116/UE 110.

In a variation of this alternative, rather than storing an association between the Endpoint Client Name and the other information it has for the DM Client 116/UE 110, the BSF 130 or NAF 122 may link the data from which the Endpoint Client Name is set (for example, the at least part of one or more items of data that the Endpoint Client Name is set to equal, or from which the Endpoint Client Name is derived) with the other information for the DM Client 116/UE 110. The BSF 130 or NAF 122 may then obtain the Endpoint Client Name using the other information it has for the DM Client 116/UE 110 by looking up the data to which the other information is linked and then determine the Endpoint Client Name from that data (or, optionally, where the BSF 130 has stored this data, it may return it to the NAF 122 during verification and the NAF 122 may then determine the Endpoint Client Name from the data so that it can verify the Endpoint Client Name it receives in a Register operation).

By carrying out these verification steps, it may be more difficult for a fraudulent third party to impersonate the UE 110, thereby improving the security of the registration process and preventing fraud on the network.

Additionally, or alternatively, if the UE 110 has set the Lifetime parameter, the NAF 122 may check that the Lifetime parameter matches, or compares in an expected way with, the lifetime of the shared secret. For example, it may compare the two lifetimes and if they do not meet a comparison condition, (which might be any suitable condition, for example, that the Lifetime parameter is equal to the lifetime of the shared secret, or that the Lifetime parameter is some amount greater than the lifetime of the shared secret, for example greater by 12 hours, or 24 hours, three days, or any other suitable amount, or that the Lifetime parameter is at least some amount greater than the lifetime of the shared secret, such as 12 hours, or 24 hours, or three days, or any other suitable amount, or that the Lifetime parameter is less than the lifetime of the shared secret, for example less by a particular period of time or less by a particular division of the lifetime of the shared secret), the NAF 122 may return an error message to the DM client 116 in step 520 to indicate that registration has failed. If, however, the comparison does meet the comparison condition, the NAF 122 may continue with the registration process as normal.

After a secure interface between the UE 110 and the NAF 122 has been registered, the DM client 116 may transmit an "Update" operation in step 530. More details relating to the Update operation may be found in section 5.2.2 of OMA-TS-LightweightM2M-V1_0-20131210-C. The Update operation may be used to update the registration information with the NAF 122 where one or more of the parameters of the registration have changed compared with an earlier Register or Update operation. For example, a new shared secret and/or identifier of the shared secret may have been obtained by the UE 110, and consequently the Lifetime parameter may have changed.

One of the parameters of the Update operation that the DM client 116 may set is the Lifetime parameter. Therefore, if the Lifetime parameter has changed, for example after a re-run of the bootstrapping process, the DM client 116 may set the Lifetime parameter of the Update operation based on the new lifetime of the shared secret in the same way as described above in respect of the Register operation and transmit the Update operation in step 530.

Upon receipt of the Update operation in step 530, the NAF 122 may optionally check that the Lifetime parameter compares in an expected way with the lifetime of the indicator of the shared secret and/or verify the Endpoint Client Name, in the same way as described above in respect of the Register operation. If this check(s) fails, the NAF 122 may return an error message to the DM client 116 in step 540 to indicate that the update has failed. If the check is successful, the NAF 122 may continue the update process as normal.

If the update is successful, the NAF 122 may transmit a "Changed" message to the DM client 116 in step 540 to confirm that the update has been successful.

It is to be understood that the above description is given by way of example and only for the benefit of understanding the solution, and it must include also any combination of the above features, as well as any alterations, modifications or otherwise additions which could be made by a skilled person using his/her skills and/or general knowledge in the relevant and/or neighbouring art.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

In the above embodiments, the NAF 122 is implemented as part of the DM server 120, for example as a plug-in component to the DM server 120.

However, the NAF 122 may be any server or network component which terminates the Ua 150 and uses a shared secret established by GBA to secure communications on that interface. The NAF 122 may form at least part of the DM server 120 or may exist separately from the DM server 120. In this way, the NAF could be any application.

For example, the NAF 122 may be the DM server 120, i.e. the NAF 122 may be identical to the DM server 120, or it may be a plug-in component in the DM server 120.

Alternatively, the NAF 122 may act as a proxy in front of the DM server 120. As a proxy, the NAF 122 would terminate the connection from the UE 110 (thus acting as a server to the UE 110) and start a new connection with the DM server 120 (thus acting as a client to the DM server 120).

Alternatively, the NAF 122 may act as a router, located between the UE 110 and the DM server 120. The NAF 122 may then pass Ua 150 traffic from the UE 110 on to the DM server 120 and pass Ua 150 traffic from the DM server 120 back to the UE 110.

Located either as at least part of the DM server 120 or located separately from the DM server 120, the NAF 122 can terminate the security established over the Ua 150 interface using the Ks_NAF (or a key(s) derived from the Ks_NAF) and then pass the Ua 150 traffic on to the DM server 130, either unencrypted, or encrypted in a way that does not necessarily require the DM server 130 to be GBA aware. In this way, the functionality of the DM server 130 does not have to be altered in any way and does not need to be 'GBA aware'.

The DM server 130 may, for example, be a DM bootstrapping server, a LWM2M server or LWM2M bootstrapping server, or any generic application that may benefit from GBA.

Whilst in the above, securing of communications over the interface between the UE 110 and the NAF 122 (for example Ua 150) is achieved with use of a shared secret (for example, Ks_NAF) and an identifier of the shared secret (for example, P-TID or B-TID), it will be appreciated that it may be achieved in any other suitable way. For example, one or more keys that are derived from the shared secret (such as Ks_NAF) may be used to carry out a symmetric or asymmetric security process in order to secure the interface between the UE 110 and the NAF 122. Additionally, or alternatively, the UE 110 may comprise security information that comprises a public key (for example, RPK) that can be used as a parameter in the Register operation to register a secure interface, and/or it may comprise a certificate that can be used as a parameter in the Register operation to register a secure interface. In each of these cases, the security information that is used in registering the secure interface may have an associated lifetime that may be used in the setting of the Lifetime parameter. For example, for a certificate, there may be a validity date within the certificate that can represent the lifetime of the certificate. For a public key (for example, a "raw" public key) the key may have been supplied to the UE 110 by a bootstrapping server, for example a LWM2M bootstrapping server, (along with the private key), or by bootstrapping from the UICC 112, or by manufacturer bootstrapping. In any case, the bootstrapping server/UICC 112/manufacturer might have associated a lifetime with the key.

Furthermore, in the above, the Endpoint Client Name may be linked to other information related to the DM client 116/UE 110 (for example the B-TID/P-TID and/or the UE-Id) so that the NAF 122 may later verify the Endpoint Client Name it receives from the UE 110. However, in addition, or as an alternative, to this, the NAF 122 could pass a "hint" at the Endpoint Client Name to the BSF 130 (for example, by using one of the data fields available on the Zn/Zpn interface) and ask the BSF 130 to confirm if that hint is correct (for example, by returning the full Endpoint Client Name in response). The hint may be, for example, a part of the Endpoint Client Name that the NAF 122 has received from the UE 110 and/or a hash of the Endpoint Client Name that the NAF 122 has received from the UE 110.

For example, the NAF 122 may pass as the hint to the BSF 130 the "data element" (which could be equal to or derived from the shared data that is linked to the Endpoint Client name). For example, it may pass the B-TID. The BSF 130 can then look up the linked Endpoint Client Name and check that it is consistent with the hint.

Additionally, or alternatively, the hint may be constructed in such a way that there is an effective 1-1 mapping between Endpoint Client Names and hints, for example, the hint is a hash of the Endpoint Client Name, or the Endpoint Client Name contains a lot of random data and the hint contains enough of that random data to ensure effective uniqueness (the hint might contain 128 bit of random data, for instance). In that case, the BSF 130 can maintain a look-up table between hints and Endpoint Client Names and use the hint to retrieve the matching name.

The BSF 130 may link the Endpoint Client Name to other information by storing the Endpoint Client Name at the BSF 130, or at a location accessible to the BSF 130 (for example, a database accessible to the BSF 130), with an association to the other information it has for the DM Client 116/UE 110. Alternatively, it may link the data from which the Endpoint Client Name is set (for example, the at least part of one or more items of data that the Endpoint Client Name is set to equal, or from which the Endpoint Client Name is derived) with the other information.

The BSF 130 may then obtain the Endpoint Client Name from the other information it has for the DM Client 116/UE 110 by using the other information to look up the data to which it is linked and then determining the Endpoint Client Name from that data. Alternatively, as part of the verification process described above, the BSF 130 may pass to the NAF 122 the data that is linked to the other information for the DM Client 116/UE 110 and the NAF 122 may then itself obtain the Endpoint Client Name from that data in order to verify an Endpoint Client Name that it has received from the UE 110.

In the above, communications between the UE 110 and the NAF 122 are secured using the LWM2M protocol. However, it will be appreciated that any suitable protocol such as OMA DM 1.0-1.3, OMA DM 2.0, or TR-069 may be used for this purpose and that any parameters to the protocol that are equivalent to the Endpoint Client Name and/or the Lifetime parameter may be set in an analogous way to that described above.

In the above described embodiments, each of the BSF 130, DM server 120 and NAF 122 are shown in the Figures as being implemented on single server elements. However, it will be appreciated that the functionality of each of the BSF 130, the DM server 120 and the NAF 122 may be spread across two or more devices, each of which may be co-located or located at a distance from one another.

Furthermore, in the above described embodiments and the representations shown in the Figures, the interfaces between the NAF 122 and the UE 110, between the BSF 130 and the NAF 122 and between the BSF 130 and the HLR/HSS 140 are represented as direct interfaces. However, it will be appreciated that any one or more of those interfaces may take any suitable form, whereby one or more intermediate devices or elements, for example communication routing devices, may be implemented as part of the interfaces.

The invention claimed is:

1. A method for a machine-to-machine (M2M) device to administer an interface between the M2M device and a network application function (NAF) for secure communication between the M2M device and the NAF, wherein the M2M device comprises security information as a key for enabling secure communication via the interface, the method comprising the steps of initiating, before expiry of a lifetime of at least part of the security information and on wake up from a sleep cycle:
   setting a secure interface lifetime parameter based on a lifetime of the at least part of the security information;
   transmitting administration data to the NAF, wherein the administration data comprises the secure interface lifetime parameter;
   after determining that a registration of the interface is about to expire, pre-emptively initiating a new bootstrapping process to obtain new security information, the initiating being pre-emptive as a result of obtaining the new security information prior to expiration of the registration; and
   using the new security information to either update the registration or, alternatively, to carry out a new registration.

2. The method of claim 1, wherein the secure interface lifetime parameter is set to a value greater than or equal to the lifetime of the at least part of the security information.

3. The method of claim 1, wherein the secure interface lifetime parameter is set to a value greater than the lifetime of the at least part of the security information.

4. The method of claim 1, wherein the secure interface lifetime parameter is set to a value greater than the lifetime of the at least part of the security information by a first amount.

5. The method of claim 1, wherein the secure interface lifetime parameter is set to a value less than or equal to the lifetime of the at least part of the security information.

6. The method of claim 1, wherein the secure interface lifetime parameter is set to a value less than or equal to the lifetime of the at least part of the security information.

7. The method of claim 1, wherein the secure interface lifetime parameter is set to a value less than the lifetime of the at least part of the security information by a second amount.

8. The method of claim 1, further comprising the steps of:
   checking the remaining lifetime of the at least part of the security information; and if the remaining lifetime of the at least part of the security information is less than a security information lifetime threshold, requesting new security information from a bootstrapping server.

9. The method of claim 8, further comprising the step of:
   if the request for new security information fails, repeating the request for new security information after a period of time.

10. The method of claim 8, wherein the step of checking the remaining lifetime of the security information is carried out before a secure communication transmission from the M2M device to the NAF via the interface.

11. A method for a network application function (NAF) to administer an interface between the NAF and a machine-to-machine (M2M), device, wherein the M2M device comprises security information as a key for enabling secure communication via the interface, the method comprising the steps of:
   receiving, before expiry of a lifetime of at least part of the security information and on wake up from a sleep cycle, administration data from the M2M device, the registration data comprising a secure interface lifetime parameter that has been set based on a lifetime of the at least part of the security information;
   transmitting an administration response to the M2M device;
   after determining that a registration of the interface is about to expire, pre-emptively initiating a new bootstrapping process to obtain new security information, the initiating being pre-emptive as a result of obtaining the new security information prior to expiration of the registration; and
   using the new security information to either update the registration or, alternatively, to carry out a new registration.

12. The method of claim 11, wherein the administration data comprises the at least part of the security information, the method further comprising:

checking the lifetime of the at least part of the security information; and comparing the secure interface lifetime parameter with the lifetime of the at least part of the security information;

wherein if the comparison does not meet a comparison condition, the administration response is set to indicate an error in the administration data.

13. The method of claim 12, wherein the comparison condition is that the secure interface lifetime parameter is greater than or equal to the lifetime of the at least part of the security information.

14. The method of claim 12, wherein the comparison condition is that the secure interface lifetime parameter is greater than the lifetime of the at least part of the security information.

15. The method of claim 12, wherein the comparison condition is that the secure interface lifetime parameter is greater than the lifetime of the at least part of the security information by a first amount.

16. The method of claim 12, wherein the comparison condition is that the secure interface lifetime parameter is less than or equal to the lifetime of the at least part of the security information.

17. The method of claim 12, wherein the comparison condition is that the secure interface lifetime parameter is less than the lifetime of the at least part of the security information.

18. The method of claim 12, wherein the comparison condition is that the secure interface lifetime parameter is less than the lifetime of the at least part of the security information by a second amount.

19. The method of claim 11, further comprising a step of:
obtaining the lifetime of the at least part of the security information.

20. The method of claim 11, wherein:
the administration data further comprises a name for the M2M device; and wherein the name for the M2M device is equal to, or derived at least in part from, or otherwise linked to, at least part of data that are shared between the M2M device and the bootstrapping server.

* * * * *